(12) United States Patent
Kariyawasam et al.

(10) Patent No.: US 6,556,924 B1
(45) Date of Patent: Apr. 29, 2003

(54) MAINTENANCE OPTIMIZATION SYSTEM FOR WATER PIPELINES

(75) Inventors: Shahani N. Kariyawasam, Edmonton (CA); Maher A. Nessim, Edmonton (CA); Yuwu Yu, Edmonton (CA); Lawrence B. Staples, Edmonton (CA)

(73) Assignee: Hydroscope Canada Inc., Edmonton (CA)

( * ) Notice: Subject to any disclaimer, the term of this patent is extended or adjusted under 35 U.S.C. 154(b) by 138 days.

(21) Appl. No.: 09/626,833

(22) Filed: Jul. 27, 2000

(51) Int. Cl.⁷ .............................. G01B 3/44; G01B 3/52; F16L 55/00
(52) U.S. Cl. ..................... 702/34; 702/181; 702/184; 285/15; 405/184.1
(58) Field of Search ................. 702/33, 34, 35, 702/36, 38, 113, 119, 170, 171, 172, 155, 156, 157, 179, 183, 184, 185, 181; 138/36; 285/15; 700/98, 110; 703/2, 7, 10; 705/500; 405/184.1

(56) References Cited

U.S. PATENT DOCUMENTS

| | | | | |
|---|---|---|---|---|
| 4,504,365 A | * | 3/1985 | Kellner ..................... | 205/776.5 |
| 4,998,208 A | * | 3/1991 | Buhrow et al. ............... | 702/35 |
| 5,132,920 A | * | 7/1992 | Bellows et al. .............. | 702/184 |
| 5,189,606 A | * | 2/1993 | Burns et al. ................... | 705/10 |
| 5,216,868 A | * | 6/1993 | Cooper et al. ................. | 53/79 |
| 5,218,868 A | * | 6/1993 | Yamazaki et al. ............. | 73/622 |
| 6,170,344 B1 | * | 1/2001 | Ignagni ..................... | 73/865.8 |
| 6,226,597 B1 | * | 5/2001 | Eastman et al. .............. | 702/34 |

FOREIGN PATENT DOCUMENTS

| | | | | |
|---|---|---|---|---|
| JP | 200230879 A | * | 8/2000 | |
| JP | 2000-230879 | * | 8/2000 | ............ G01M/3/04 |
| SU | 1661698 A1 | * | 7/1991 | ............ G01R/19/00 |

* cited by examiner

Primary Examiner—Marc S. Hoff
Assistant Examiner—Manuel L. Barbee
(74) Attorney, Agent, or Firm—Christensen O'Connor Johnson Kindness PLLC

(57) ABSTRACT

A method of determining optimal repair options for cast iron and ductile iron water or wastewater pipe sections having a number of pipe-lengths is provided. The method includes the computer-implemented steps of inputting measured pipe-length wall dimensional data, determining pipe failure rates for current and future times based on the input data, defining one or more repair scenarios for the pipe, and determining the pipe failure rates for the defined repair scenarios. The pipe failure rate determinations are provided to the user as an output. The calculation of failure rates includes determining probability of pipe-length failure due to corrosion and determining probability of pipe-length failure due to transverse bending.

37 Claims, 25 Drawing Sheets

*226*

Section Data Input

Time period for analysis: 50 — 228
Time interval (yrs): 1 — 230
Real Interest rate (%): 4.0 — 232
Annual probability of breaks due to other causes: 0.000 — 234
Annual probability of leaks due to other causes: 0.000 — 236
238
Failure cost/emergency repair cost (breaks and major leaks)($/repair): 4400 — 240
Cost of a minor leak ($/yr): 500 — 242

244 — Print    246 — OK    248 — Cancel

FIG. 8

Failure Cost/Emergency Repair Cost Calculator

250 — Labour, equipment and materials (own crew)

- notification, temporary services, traffic control ($) ......... 500
- excavation, clamp/replace, backfill, flush ($) ............... 2200
- pavement patching, relandscaping ($) ........................ 300
- G and A allocation for above (for full costing) ($) ......... 900
- third party costs (other utility repairs, customer property damage) ($) ............... 500
- penalty cost (loss of critical service, e.g. school or business disruption) ($) ............ 0

Total cost per repair ($) = 4400

252 — Subcontract

- Subcontractor cost ($) ........................... 4500
- Insurance cost ($) ............................... 500
- Other cost ($) ................................... 0

Total cost per repair ($) = 5000

[ OK ]   [ Cancel ]

FIG. 9

Pipe Length Data Input

Number of pipe lengths in section: 29

Import C:\Program Files\HCI\Hyrel21\Examples\Demo.csv

| Pipe length ID | Inside diameter (mm) | Length (mm) | Spec. wall thickness (mm) | Modulus of elasticity (MPa) | Yield strength (MPa) | Age of pipe length (yrs) | Tav of pipe length (mm) | Mean msr. err of Tav (mm) | Std. of msr. err of Tav (mm) | Tn of p len (m |
|---|---|---|---|---|---|---|---|---|---|---|
| 1 | 152.0 | 4190 | 11.0 | 140000 | 276.0 | 41 | 10.890 | -1.500 | 1.850 | 1 |
| 2 | 152.0 | 4260 | 11.0 | 140000 | 276.0 | 41 | 10.340 | -1.500 | 1.850 | 1 |
| 3 | 152.0 | 4140 | 11.0 | 140000 | 276.0 | 41 | 10.450 | -1.500 | 1.850 | 1 |
| 4 | 152.0 | 4190 | 11.0 | 140000 | 276.0 | 41 | 10.450 | -1.500 | 1.850 | 1 |
| 5 | 152.0 | 4590 | 11.0 | 140000 | 276.0 | 41 | 11.000 | -1.500 | 1.850 | 1 |
| 6 | 152.0 | 3630 | 11.0 | 140000 | 276.0 | 41 | 11.000 | -1.500 | 1.850 | 1 |
| 7 | 152.0 | 4970 | 11.0 | 140000 | 276.0 | 41 | 10.670 | -1.500 | 1.850 | 1 |
| 8 | 152.0 | 1800 | 11.0 | 140000 | 276.0 | 41 | 11.000 | -1.500 | 1.850 | 1 |
| 9 | 152.0 | 4180 | 11.0 | 140000 | 276.0 | 41 | 10.230 | -1.500 | 1.850 | 1 |
| 10 | 152.0 | 4720 | 11.0 | 140000 | 276.0 | 41 | 10.670 | -1.500 | 1.850 | 1 |
| 11 | 152.0 | 4290 | 11.0 | 140000 | 276.0 | 41 | 10.010 | -1.500 | 1.850 | 1 |
| 12 | 152.0 | 4130 | 11.0 | 140000 | 276.0 | 41 | 10.780 | -1.500 | 1.850 | 1 |
| 13 | 152.0 | 4630 | 11.0 | 140000 | 276.0 | 41 | 10.010 | -1.500 | 1.850 | 1 |
| 14 | 152.0 | 3760 | 11.0 | 140000 | 276.0 | 41 | 10.340 | -1.500 | 1.850 | 1 |
| 15 | 152.0 | 4170 | 11.0 | 140000 | 276.0 | 41 | 10.340 | -1.500 | 1.850 | 1 |
| 16 | 152.0 | 4260 | 11.0 | 140000 | 276.0 | 41 | 8.690 | -1.500 | 1.850 | 1 |
| 17 | 152.0 | 4190 | 11.0 | 140000 | 276.0 | 41 | 11.000 | -1.500 | 1.850 | 1 |

Print    OK    Cancel

FIG. 10

| Pipe length ID | Total INITIAL Cum. Failure Rate | Initial Cum. Failure Rate due to BREAK | Initial Cum. Failure Rate due to LEAK | Total Cum. Failure Rate @ 50 yrs | Cum. Failure Rate due to BREAK @ 50 years | Cum. Failure Rate due to LEAK @ 50 years |
|---|---|---|---|---|---|---|
| 16 | 0.226652 | 0.226652 | 0.000000 | 0.762762 | 0.762762 | 0.000000 |
| 22 | 0.092899 | 0.092695 | 0.000204 | 0.367699 | 0.298477 | 0.069221 |
| 21 | 0.062744 | 0.062744 | 0.000000 | 0.407396 | 0.400418 | 0.006977 |
| 23 | 0.045569 | 0.045569 | 0.000010 | 0.357123 | 0.357029 | 0.000095 |
| 24 | 0.027336 | 0.027326 | 0.000000 | 0.278371 | 0.243702 | 0.034669 |
| 2  | 0.025391 | 0.025391 | 0.000000 | 0.173773 | 0.168344 | 0.005429 |
| 14 | 0.018695 | 0.018695 | 0.000000 | 0.157923 | 0.153004 | 0.004920 |
| 18 | 0.017901 | 0.017901 | 0.000000 | 0.137246 | 0.136265 | 0.000980 |
| 12 | 0.012441 | 0.012441 | 0.000000 | 0.123929 | 0.123929 | 0.000000 |
| 19 | 0.010631 | 0.010631 | 0.000000 | 0.079339 | 0.079339 | 0.000001 |
| 25 | 0.009397 | 0.009397 | 0.000000 | 0.102626 | 0.100026 | 0.002600 |
| 20 | 0.007069 | 0.007067 | 0.000001 | 0.088971 | 0.074309 | 0.014662 |
| 11 | 0.005388 | 0.005388 | 0.000000 | 0.053196 | 0.053194 | 0.000003 |
| 15 | 0.005379 | 0.005379 | 0.000000 | 0.058551 | 0.057625 | 0.000926 |
| 3  | 0.003503 | 0.003503 | 0.000000 | 0.042183 | 0.042183 | 0.000000 |
| 26 | 0.003473 | 0.003473 | 0.000000 | 0.036187 | 0.035756 | 0.000431 |
| 27 | 0.003273 | 0.003273 | 0.000000 | 0.036728 | 0.036728 | 0.000000 |
| 10 | 0.003163 | 0.003163 | 0.000000 | 0.034899 | 0.034883 | 0.000016 |
| 13 | 0.002457 | 0.002457 | 0.000000 | 0.026623 | 0.026623 | 0.000000 |
| 9  | 0.001977 | 0.001977 | 0.000000 | 0.020951 | 0.020950 | 0.000001 |

FIG. 12

Repair Cost Calculator - Clamp and Replace

○ Repair Option Costs (own crew)

| | Labour Charges ($) | Equipment Charges ($) | G and A Allocation ($) | Materials ($) | Total ($) |
|---|---|---|---|---|---|
| Auger Anode - pipe length | | | | | |
| - fixed cost to mobilize crew and equipment to site | | | | | |
| - incremental cost to install an Auger anode | | | | | |
| Clamp and Replace - pipe length | | | | | |
| - fixed cost to mobilize crew and equipment to site | 270 | 240 | 260 | 150 | 920 |
| - incremental cost to install clamps - per pipe length | 370 | 310 | 350 | 320 | 1350 |
| - incremental cost to replace each pipe length | 630 | 500 | 590 | 1460 | 3180 |
| Structural/non-structural liner - pipe length | | | | | |
| - fixed cost to mobilize crew and equipment to site | | | | | |
| - incremental cost to install NSL - per pipe length | | | | | |
| - incremental cost to install SL - per pipe length | | | | | |

○ Subcontract

| | Subcontract ($) | Other ($) | Total ($) |
|---|---|---|---|
| Fixed cost per site | | | |
| Inc. cost to install clamps per pipe length | | | |
| Inc. cost to replace each pipe length | | | |

340

342

344

[OK] [Cancel]

FIG. 14

| Time (yrs) | Pipe Length ID | No Action | No Action Break | No Action Leak | Scenario A | Scenario B | Scenario C |
|---|---|---|---|---|---|---|---|
| 1 | 1 | 0.0010402 | 0.0010402 | 0.0000000 | 0.0010402 | 0.0010402 | 0.0010402 |
| 2 | 1 | 0.0011158 | 0.0011158 | 0.0000000 | 0.0011158 | 0.0011158 | 0.0011158 |
| 3 | 1 | 0.0011953 | 0.0011953 | 0.0000000 | 0.0011953 | 0.0011953 | 0.0011953 |
| 4 | 1 | 0.0012789 | 0.0012789 | 0.0000000 | 0.0012789 | 0.0012789 | 0.0012789 |
| 5 | 1 | 0.0013668 | 0.0013668 | 0.0000000 | 0.0013668 | 0.0013668 | 0.0013668 |
| 6 | 1 | 0.0014591 | 0.0014591 | 0.0000000 | 0.0014591 | 0.0014591 | 0.0014591 |
| 7 | 1 | 0.0015560 | 0.0015560 | 0.0000000 | 0.0015560 | 0.0015560 | 0.0015560 |
| 8 | 1 | 0.0016574 | 0.0016574 | 0.0000000 | 0.0016574 | 0.0016574 | 0.0016574 |
| 9 | 1 | 0.0017637 | 0.0017637 | 0.0000000 | 0.0017637 | 0.0017637 | 0.0017637 |
| 10 | 1 | 0.0018749 | 0.0018749 | 0.0000000 | 0.0018749 | 0.0018749 | 0.0018749 |
| 11 | 1 | 0.0019911 | 0.0019911 | 0.0000000 | 0.0019911 | 0.0019911 | 0.0019911 |
| 12 | 1 | 0.0021125 | 0.0021125 | 0.0000000 | 0.0021125 | 0.0021125 | 0.0021125 |
| 13 | 1 | 0.0022393 | 0.0022393 | 0.0000000 | 0.0022393 | 0.0022393 | 0.0022393 |
| 14 | 1 | 0.0023716 | 0.0023716 | 0.0000000 | 0.0023716 | 0.0023716 | 0.0023716 |
| 15 | 1 | 0.0025094 | 0.0025094 | 0.0000000 | 0.0025094 | 0.0025094 | 0.0025094 |
| 16 | 1 | 0.0026530 | 0.0026530 | 0.0000000 | 0.0026530 | 0.0026530 | 0.0026530 |
| 17 | 1 | 0.0028024 | 0.0028024 | 0.0000000 | 0.0028024 | 0.0028024 | 0.0028024 |
| 18 | 1 | 0.0029579 | 0.00029579 | 0.0000000 | 0.00029579 | 0.00029579 | 0.0029579 |
| 19 | 1 | 0.0031195 | 0.0031195 | 0.0000000 | 0.0031195 | 0.0031195 | 0.0031195 |
| 20 | 1 | 0.0032873 | 0.0032873 | 0.00000000 | 0.0032873 | 0.00032873 | 0.0032873 |

FIG. 16

Cost Summary

| | Section Replace-ment | No Action | Repair Scenario A | Repair Scenario B | Repair Scenario C |
|---|---|---|---|---|---|
| Construction cost ($) | | 0 | | | |
| Related cost ($) | 0 | 141136 | 13025 | 63803 | 119888 |
| Expected failure cost ($) | | | | | |
| Life cycle savings ($) | | | | | |
| Total ($) | | | | | |

FIG. 21

Related Cost Calculator

| | | |
|---|---|---|
| Business annual revenue volume per block | | 1000000 |
| Gross profit margin (%) | | 10 |
| Business tax rate (%) | | 30 |
| Traffic volume (vehicles/day) | | 500 |
| Vehicle operating cost ($/km) | | 0.50 |

| | Replacement | No action | Repair scenario A | Repair scenario B | Repair scenario C |
|---|---|---|---|---|---|
| No. of blocks disrupted by construction | 0 | | 0 | 0 | 0 |
| Days of disruption | 0 | | 0 | 0 | 0 |
| Lost business profit (B) ($) | 0 | | 0 | 0 | 0 |
| Lost gov't bus tax (G) ($) | 0 | | 0 | 0 | 0 |
| Traffic detour length (km) | 0.0 | | 0.0 | 0.0 | 0.0 |
| Days detoured | 0 | | 0 | 0 | 0 |
| Cost to vehicle owner (V) ($) | 0 | | 0 | 0 | 0 |
| Total related costs ($) ([B-G]+G+V) | 0 | | 0 | 0 | 0 |

OK    Cancel

FIG. 23

Life Cycle Savings Calculator — 540

Estimated water loss from existing line ($m^3$/yr) .................... 500
Cost of water treatment ($/$m^3$) ............................................ 0.50
Retail price of water ($/$m^3$) ................................................. 1.00

|  | Section replace-ment | No action | Repair scenario A | Repair scenario B | Repair scenario C |
|---|---|---|---|---|---|
| Estimated reduction of water loss (%) | 0 |  | 0 | 0 | 0 |
| Number of years | 0 |  | 0 | 0 | 0 |
| ⊙ Saved treatment costs ($) | 0 |  | 0 | 0 | 0 |
| ○ Lost retail revenues ($) |  |  |  |  |  |
| Other savings ($) | 0 |  | 0 | 0 | 0 |
| Total savings ($) | 0 |  | 0 | 0 | 0 |

OK   Cancel

FIG. 24

MAINTENANCE OPTIMIZATION SYSTEM FOR WATER PIPELINES

FIELD OF THE INVENTION

The present invention relates to computer-implemented systems for enabling a user to determine optimal pipeline maintenance options for cast and ductile iron water mains, and more particularly, to maintenance optimization systems that use pipeline defect measurement data.

BACKGROUND OF THE INVENTION

Pipelines, such as water mains and sewers, are vital to the quality of life of individual citizens and to the economic productivity of society. Over time, water pipelines will deteriorate, and eventually, they will fail entirely. Keeping these lines operable is a challenge faced by every community, both in terms of maintenance and repair costs and in terms of engineered capacity. In meeting these challenges, it is essential to have accurate information on the condition of the pipeline, the various options available for dealing with potential defects, and the cost associated therewith.

Recently, a technology has emerged that measures the condition of water pipelines in a non-destructive manner. This technique, termed the remote field eddy current technique or remote field technique, produces measurement data which may be manipulated into estimates of the physical dimensions and characteristics of the pipeline, including estimates of defect sizes and locations.

Just knowing defect dimensions, however, is not sufficient for businesses and municipalities to determine what to do about a particular deteriorating pipeline. The defect physical dimensions do not readily indicate as to how long before they fail or the potential cost of their repair. Therefore, a need exists for a method and system of using this measurement data to provide an estimate of the likelihood of failure at ferrous pipeline defect locations and an estimate of the costs associated with various repair options. The present invention is directed to fulfilling this need.

SUMMARY OF THE INVENTION

In accordance with aspects of the present invention, a method of determining optimal repair options for cast iron and ductile iron water or wastewater pipe sections having a number of pipe-lengths is provided. The method includes the computer-implemented steps of inputting measured pipe-length wall dimensional data, determining pipe failure rates for current and future times based on the input data, defining one or more repair scenarios for the pipe, and determining the pipe failure rates for the defined repair scenarios. The pipe failure rate determinations are provided to the user as an output. The calculation of failure rates includes determining probability of pipe-length failure due to corrosion and determining probability of pipe-length failure due to transverse bending.

In accordance with further aspects of this invention, a method is provided in a computer system having a graphical user interface including a display and a user interface selection device. The method includes displaying a menu including selections of input pipe data, set pipe repair options, and display pipe output information. The method receives instruction from a user to input pipe data and in response inputs pipe wall dimensional data. The method also receives instruction from the user to set pipe repair options and in response allows definition of east one repair scenario for the pipe section. By determining pipe failure rates for the at least one defined repair scenario, including determining pipe failure rates for current and future times based on the wall dimensional input data, the information can be displayed to the user as output information upon request.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 7 through 20 are screen displays illustrating various computer monitor display screens for use with the computer process flow diagrams of FIGS. 4–6;

FIG. 7 is a display screen of one embodiment of a main menu;

FIG. 8 is an embodiment of a display screen for entering section data input;

FIG. 9 is an embodiment of a display screen for calculating failure cost;

FIG. 10 is an embodiment of a display screen for inputting pipe-length data;

FIG. 11 is an embodiment of a display screen for setting repair options;

FIG. 12 is an embodiment of a display screen that lists failure information for each pipe-length;

FIGS. 13, 14, and 15 are display screens useful in entering cost and technical data for each repair option;

FIGS. 16 through 20 are display screens illustrating the analysis results of the computations; and FIGS. 21–24 are display screens useful in various types of cost information.

DETAILED DESCRIPTION OF THE PREFERRED EMBODIMENT

The present invention is a method and a computer program and display interface formed according to the method that enables a user to determine optimal maintenance repairs for cast iron and ductile iron water mains that have been inspected using a remote field eddy current measurement device. The device inspects a pipe section consisting of a number of pipe-lengths, and collects quantitative data regarding the wall thickness of each pipe-length. A pipe-length is defined as a sub-portion of an entire pipe section. Pipe-lengths are connected by bell-and-spigot connections, elbows, tees, etc. Pipe defects include localized pitting and general wall loss due to corrosion.

Figure 1:
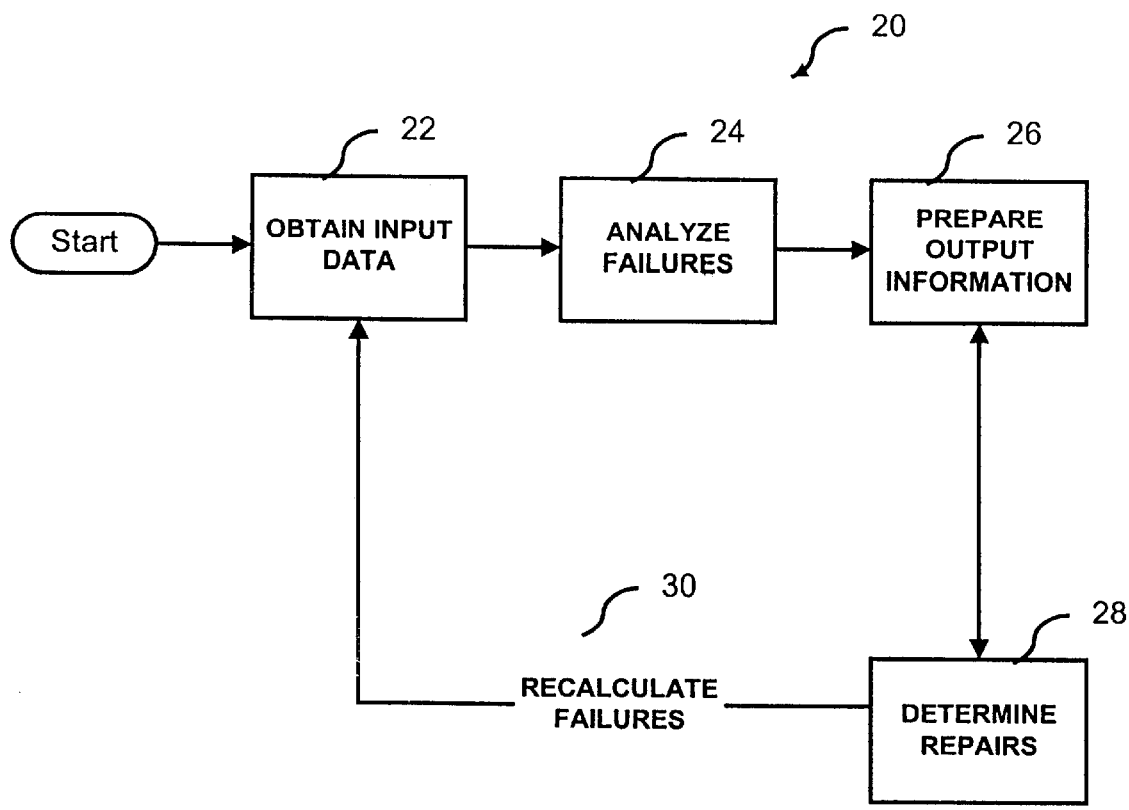
FIG. 1 is a diagram illustrating an embodiment of a maintenance optimization method formed in accordance with the present invention.

Referring to FIG. 1, one method 20 formed in accordance with the present invention includes obtaining wall thickness measurement input data at block 22. The inspection measurements are used to determine the failure rate of each pipe-length at various times t, at block 24. The analysis includes a calculation of a total pipe failure rate due to leak failure from pit corrosion as well as break failure from applied bending moments on corroded pipe. Output information is prepared at block 26, including preparation of total failure rates for each pipe-length, total failure rates for the pipe section, and expected annual cost for the pipe section.

Using this information, the user can select from a number of repair options for pipe-lengths that appear to be at high risk of failure at block 28. In one embodiment, the method includes logic that prepares a suggested repair scenario, thus reducing the burden on the user to decide repairs. Failure analysis information requiring updating due to the selected repairs (including the failure rate per pipe-length for each repair option) is initiated at block 30 and recalculated via blocks 22, 24, and 26. The output information includes information regarding the reliability of the pipe, as well as an estimate of the costs associated with each selected maintenance option. In this manner, measurement data is obtained and manipulated to a form that is meaningful in determining the most commercially-appropriate pipe repair action.

Figure 2:
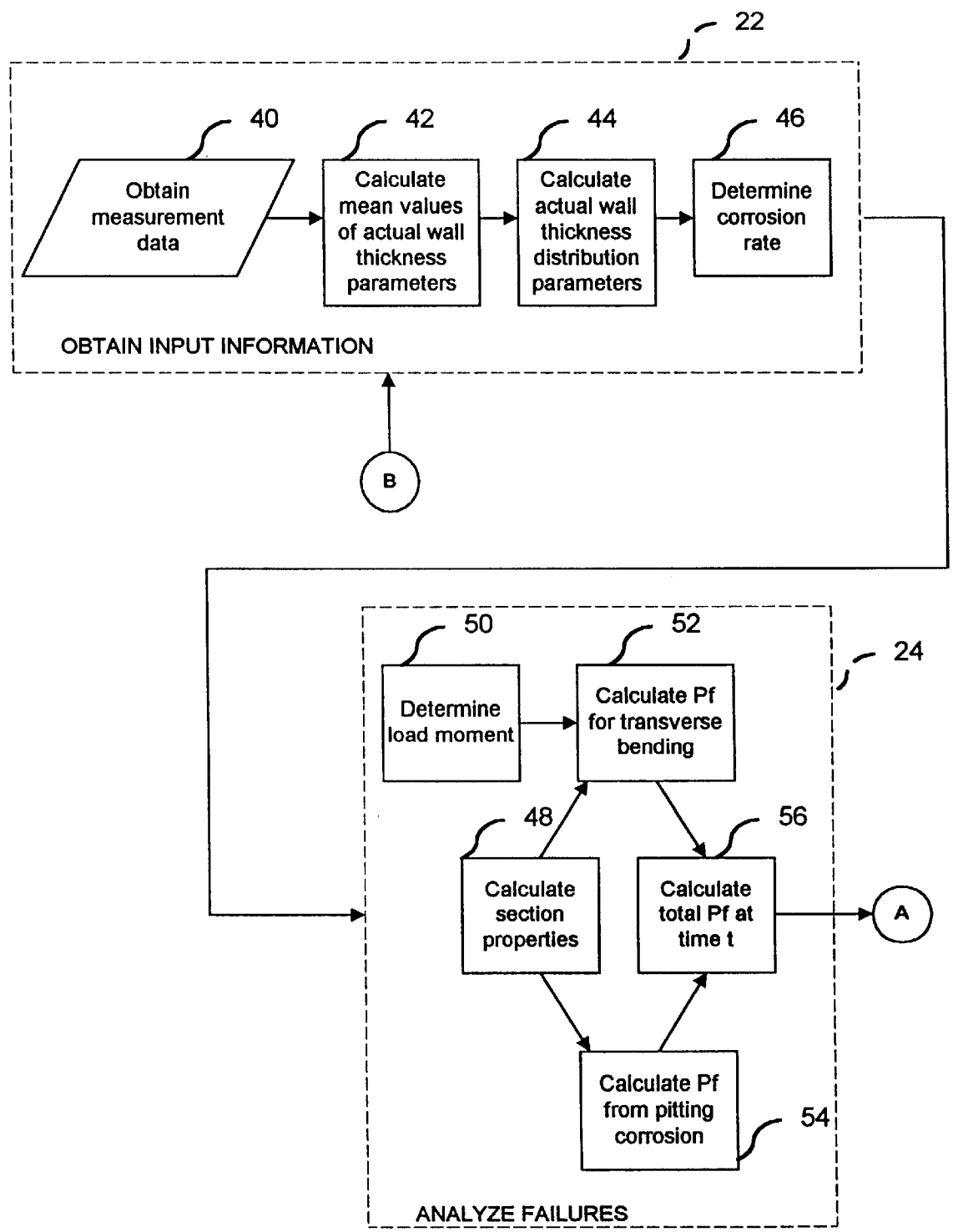
FIGS. 2 and 3 are logic flow diagrams illustrating a more detailed embodiment of the method of FIG. 1.

A more specific embodiment of the method is described with reference to FIGS. 2 and 3. In FIG. 2, data is inputted at block 40 from an electronic data file, e.g., floppy disk, tape, computer memory, etc. The data includes an organized listing of wall thickness measurements. In one embodiment, the wall thickness is modeled by a grid of measured wall thickness', $mwt_{ij}$. If the pipe-length is thought of as being cut longitudinally and "laid flat", i represents an axial location and j represents a circumferential location (i.e., i is the x-axis and j is the y-axis). The input data is provided for each pipe-length in the form of average wall thickness $\mu_{mwtij}$, for minimum wall thickness $min_{mwtij}$, and circumferential extent of the worst defect $\theta_{mwtij}$ for each pipe-length. The length of axial measurement resolution for the data is the tool resolution, dx.

Actual wall thickness distribution parameters ($\mu_{wtij}$, $min_{wtij}$, $\theta_{wtij}$) can be calculated at block 44 as the measured wall thickness ($\mu_{mwtij}$, $min_{mwtij}$, $\theta_{mwtij}$) plus a corresponding measurement error parameters ($C_\mu$, $C_{min}$, $C_\theta$, respectively). These parameters are determined prior at block 42. In this way, the inaccuracies associated with the measured values of each of the three parameters are accounted for. In one embodiment, the measurement error parameter is established prior, by inspecting a pipe in situ using a particular inspection device and verifying the results by excavating the pipe and performing physical measurements. The results are compared to determine appropriate error parameters for that inspection device.

In addition to there being an error associated with the inspection device, it is assumed that the pipe itself has a wall thickness distribution which is only sampled by the inspection device. A standard deviation $\sigma_{wtij}$ of the distribution may be obtained by equating the probability of the wall being less than or equal to the minimum wall thickness $min_{wtij}$ to 1/(nn×mm), where nn is the pipe-length divided by the tool resolution and mm is $2\pi/\theta$.

Still referring to FIG. 2, at block 46 the corrosion rate for each pipe-length in this embodiment is back-calculated using the conventional equation for corrosion rate, namely $p=Kt^n$. Using this equation, $p_{ij}=swt-wt_{ij}(t_0)=K t_0^n$, where $p_{ij}$ is the pit depth of element ij, swt is the specified wall thickness, $wt_{ij}(t_0)$ is the actual pipe-length wall thickness $wt_{ij}$ at the time of inspection $t_0$, and n is a soil aeration factor. The amount of pipe-length corrosion is based on the inspection data. The age of the pipe-length at inspection, $t_0$, and the aeration factor of the soil, n, are provided by the user or the data input file. Other corrosion models can be substituted.

Specific pipe-length failure rates at time t are determined at block 24 by calculating the total failure rate for each pipe-length at each time t at block 56 as a combination of failure rates due to perforation from corrosion pitting and failure rate due to transverse bending. These calculations depend on the pipe's wall thickness and section modulus, S. In FIG. 2, each pipe-length's section properties are calculated at block 48. The section modulus S(t) is determined for each time interval of interest. The pipe-length wall thickness at time t, $wt_{ij}(t)$ is calculated from differencing the specified wall thickness swt with the pit depth $Kt^n$ at time t. Once the pipe-length wall thickness for time t $wt_{ij}(t)$ is known, the average wall thickness $wt_r(t)$ of a circumferential ring with a width equal to the tool resolution at time t, can be obtained by dividing the summation of pipe-length wall thickness' $wt_{ij}(t)$ about the circumference by $2\pi/\theta$. The section modulus, S(t), may be obtained from the simplified formula $S(t)=\pi R^2 wt_r(t)$, where R is the average radius of the pipe-length.

The actual worst pit is the minimum of the pipe-length wall thickness and may be estimated, for example, using extreme value theory. The wall thickness for a single element $wt_{ij}$ is a random variable. The element with the smallest thickness out of the total of (nn×mm) elements represents the worst pit. The smallest value out of a set of values belonging to a certain random variable is an extreme variable. As the distribution of $wt_{ij}$ which is called the parent variable, is known, the extreme distribution of the minimum of $wt_{ij}$ is obtained using extreme value theory. Once the worst pit depth is known, the aperture area of that pit is obtained, assuming the shape of the pit to be hemispherical.

Still referring to FIG. 2, the calculation of failure rate due to transverse bending is performed at blocks 50 and 52. Transverse bending is considered since buried water pipes may be subjected to differential ground movement, which can impose bending moments that contribute to pipe failures. Transverse breaking has been determined to be a common mode of structural failure for these types of pipes.

In one embodiment, calculation of a maximum load moment is accomplished at block 52 by considering the pipe-length as an elastic beam without axial restraints and the surrounding soil as a homogeneous and isotropic elasto-plastic medium. The transition point between two discontinuous soils coincides with an inflection point of the deformed pipe where the bending moment equals zero. The deflection of the pipe and its interaction with the soil can be thus described by a set of differential equations. This method requires the user to input the soil parameters and relative free field displacement. Based on the type of soil, the subgrade modulus and soil strength need to be specified. This information may be provided as modifiable default data.

At block 52, the calculation of failure rate of each pipe-length due to transverse bending at each time t is established. A failure occurs when the bending resistance at a certain location of the pipe-length (based on section modulus S(t)) is less than the annual maximum loading moment applied to the pipe-length. Mathematically, the failure criterion is, $S(t) f_y < M_L(t)$, where $f_y$ is the yield strength of the section and $M_L(t)$ is the annual maximum load moment. Both $S(t) f_y$ and $M_L(t)$ are represented as probability distributions.

Using the above failure criterion, the probability of failure at a randomly selected location where a loading moment occurs, PFC1'(t) may be calculated. The cumulative failure rate of a pipe-length k due to transverse bending, $PFC1_k(t)$, is calculated as the cumulative probability of failure at a moment loading location times the expected number of moment loading locations occurring within a pipe-length. Mathematically, $PFC1_k(t)=PFC1_k'(t) \times f_{ml} \times L$, where $f_{ml}=$ the expected frequency of occurrence of moment loading locations (or the number of differential movement locations expected per unit length) and L is the length of a pipe-length. The resulting $PFC1_k(t)$ is interpreted as the cumulative failure rate, defined as the expected number of failures up to a given time t for each pipe-length k.

The calculation of failure rate at time t for pipe-length k due to pitting corrosion leakage, $PFC2_k(t)$, is accomplished at block 54. For pitting corrosion leakage, failure is assumed to occur if the aperture area of the worst corrosion pit at time t exceeds a user-specified limiting value, $A_{pL}$. The value of $A_{pL}$, is the aperture area that would cause 'significant' water leakage. The aperture area of the worst corrosion pit is represented as a distribution. The failure rate of pipe-length k due to pitting corrosion, $PFC2_k(t)$, is thus calculated as the probability of failure distribution at time t in excess of the value of $A_{pL}$. The above calculation of failure rate $PFC2_k(t)$ assumes the probability of multiple leaks occurring within the same pipe-length is negligible. The method can be altered to accommodate multiple leaks if desired, depending on the amount of measurement data available.

The total failure rate for pipe-length k at each time t, $PFC_k(t)$, is the rate of occurrence of either transverse bending $PFC1_k(t)$ or leakage due to pitting $PFC2_k(t)$, i.e., the union of the two failure modes. Since $PFC1_k(t)$ and $PFC2_k(t)$ are cumulative failure rates at time t, so is the total pipe-length failure rate $PFC_k(t)$ at time t. This represents the expected number of failures before (and up to) the time for which this rate is calculated. In other embodiments, additional failure models can be added, e.g., to account for the probability of longitudinal splitting of the weakened pipe wall by a pressure surge within the pipe.

Figure 3:
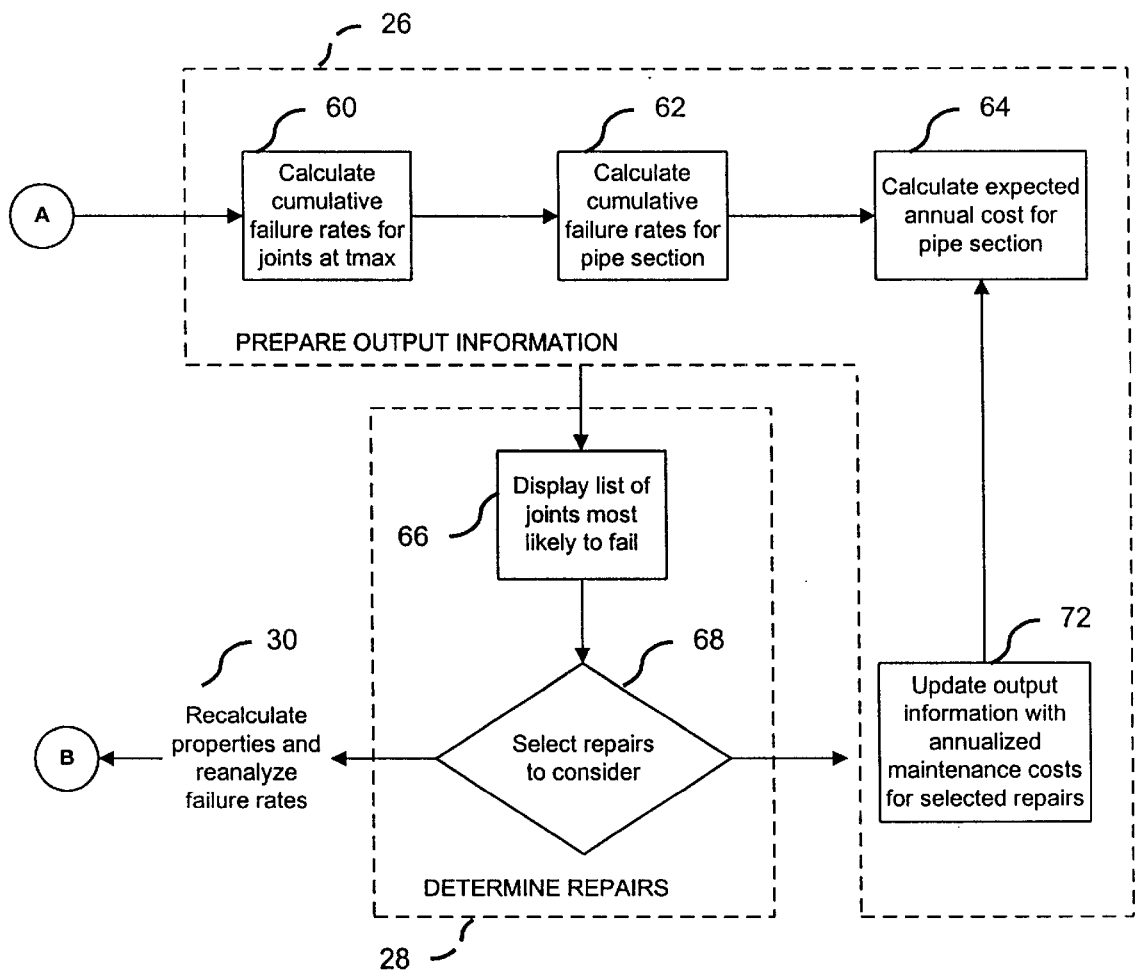

Shown in FIG. 3, the information calculated in block 56 is used at block 26 to prepare various pieces of output information. In particular, at block 60, the failure rates for each pipe-length at the maximum time period is made available for use in block 66. At block 62, the annual failure rates for the entire pipe section, $PFC_{seg}(t)$, is calculated as the summation of all pipe-length failure rates $PFC_k(t)$ at each time t. Similarly, the section failure rate due to breakage alone, $PFC1_{seg}(t)$, is the summation of all pipe-length failure rates $PFC1_k(t)$ at each time t. The section failure rate due to leakage alone, $PFC2_{seg}(t)$, is the summation of all pipe-length failure rates $PFC2_k(t)$ at each time t.

Referring now to block 64, the calculation of expected annual cost, $EAC_i(t)$, is accomplished. This cost is ultimately used as a basis for comparing different repair options. In one embodiment, $EAC_i(t)$ is the summation of annualized maintenance cost $AMC_i(t)$, annualized cost of breakage $ACB_i(t)$, and annualized cost of leakage $ACL_i(t)$; where i is the index representing the $i^{th}$ maintenance action and t is the remaining life defined as time to the next maintenance event (in years).

The AMC value is supplied from block 72. For the no action case, $AMC_{no\ action}$ is zero. Thus, only after repairs are selected in block 28 is the AMC calculated at block 72 and provided for summation into the value of EAC. At block 72, AMC is calculated as the cost of maintenance amortized over the remaining life, t, of the pipe. If an initial maintenance cost IMC is assumed to be a loan at an interest rate of r, then AMC(t) would be the annual payment required to repay the loan within a remaining period of t years. Mathematically, $AMC(t)=[IMC \times r]/[1-(1+r)^{-t}]$.

For the no action case, IMC is zero. For other maintenance options, IMC is the combination of a fixed component of maintenance cost in present day dollars, plus the number of pipe-lengths on which maintenance is performed multiplied by the incremental component of maintenance cost per pipe-length. The incremental *component of maintenance cost per pipe-length is the cost of new pipe or cost of pipe-length excavation and repair in present day dollars. This is a scheduled repair made as part of proactive maintenance, not unscheduled repair due to a failure. The cost of unscheduled repairs are relatively much higher.

Referring back to block 64, breakage occurs if bending strains exceed the structural capacity of the pipe. It is assumed that a breakage will be detected and repaired as soon as it occurs. Breakage that may have occurred before inspection is assumed to have been repaired already. Based on this, the annual cost of breakage ACB(t) is equal to the cost of failure for a breakage (CF1) times the annual rate of breakage. The total annual rate of breakage is calculated as the sum of annual rate of breakage due to corrosion (APFC1(t)) and the annual rate of breakage due to all other causes ($APF01_{seg}$). The value $APF01_{seg}$ is a user input to accommodate the risk of failures due to causes other than corrosion (e.g., massive ground movement due to landslide.) Thus, $ACB(t)=CF1 \times [APFC1_{seg}(t)+APF01_{seg}]$ The annual failure rate of pipe-length k due to bending, $APFC1_k(t)$, is calculated as $APFC1_k(t)=[PFC1_k(t)-PFC1_k(0)]/[n\{1-PFC1_k(0)\}]$; where n is the number of years from inspection to time t, $PFC1_k(t)$ is the cumulative failure rate due to bending of pipe-length k at time t calculated in block 62 above, and t is time in years from the date of inspection.

To explain this equation, it is seen that $[PFC1_k(t)-PFC1_k(0)]$ is the rate at which the pipe-length will break between time t=0 which is the time of inspection and time t. The amount $[PFC1_k(t)-PFC1_k(0)]/\{1-PFC1_k(0)\}$ is the rate at which the pipe-length will fail between inspection and time t given that it has not failed before inspection. By dividing this quantity by 'n' which is the number of years from inspection to time t, the average annual breakage rate between inspection and time t is obtained, given that the pipe-length has not failed before inspection. The annual probability of breakage for the whole pipe segment, $APFC1_{seg}(t)$, is the summation over all pipe-lengths k in the segment.

The cost of breakage, CF1, is the sum of a number of components representing break repair cost, equivalent cost of service interruption, traffic disruption, etc. In this embodiment, the cost of breakage is treated as a deterministic value defined by the user. In other embodiments, the cost of failure may be treated as a statistical distribution.

Still referring to block 64, leakage is assumed to occur due to through-holes caused by pitting corrosion. It is assumed that when perforation first occurs and for some time afterward that the leakage is "minor", i.e., not of sufficient volume to trigger an emergency repair. Only after the perforation has grown larger than a threshold aperture area is it considered to be a "major" leak and a failure requiring emergency repair. A major leak is the one caused by a through hole whose aperture area is greater or equal to $A_{pL}$; a minor leak is a through hole whose aperture area is greater than zero but smaller than $A_{pL}$. It is assumed that a major leakage triggers an emergency repair as soon as it occurs. Repairs are not usually done for minor leaks. The annual cost of a minor leak is calculated as the estimated annual cost of lost water from a minor leak, CF2A, times the annual rate of a minor leak for the pipe section, APF2A.

Based on this, the annual cost of leakage can be calculated from $ACL(t)=CF2\times[APF2_{seg}(t)+APF02_{seg}]+CF2A\times APF2A$, where $APF02_{seg}$ is the annual rate of major leakage due to all other causes and $APF2_{seg}(t)$ is the annual failure rate due to major leaks in the pipe section. The cost of a major leak, CF2, is the sum of a number of components representing labor, equipment and materials, etc. The cost of failure is treated in one embodiment as a deterministic value defined by the user. Alternatively, the cost of failure may be a statistical distribution.

As stated above, the total pipe-length failure rates $PFC_k(t)$ at time of inspection and time tm (equal to the maximum time period of interest) are made available to the viewer at block 66. Based on these values, the user can specify a number of repair scenarios at block 68, each of which is defined by a set of repair options for the pipe-lengths. For each of these repair scenarios the section properties and failure rates are re-calculated beginning at path 30. After this is accomplished, the expected annual costs are calculated for each repair scenario.

In one embodiment, the categories of rehabilitation and repair options available for selection are cathodic (also called auger anode) protection on a pipe-length basis, clamping of corrosion pits or breaks on a pipe-length basis, installation of a structural liner for at least five consecutive pipe-lengths, installation of a non-structural liner for at least five consecutive pipe-lengths, and replacement on a pipe-length basis. The user is allowed to not select a repair option to consider the ramifications of doing nothing. Other options may be added to the list of repair options.

For each repair scenario specified, the calculations of blocks 24 and 26 are performed, but with the appropriate modifications to account for the impact to reliability and expected costs.

If the measurements reveal that certain pipe-lengths (or all the pipe-lengths) are corroding but still in relatively good condition, these pipe-lengths can be preserved in good condition by providing cathodic protection to greatly reduce the rate of external corrosion. For cathodic protection, a new, lower value of corrosion rate K must be made available, by user-entry or other means. The new value of K is used to calculate the section properties at different points in time as provided above. The existing corrosion at inspection is considered to be the starting point for the new curve defined by the new K value.

If there are isolated severe pits in some pipe-lengths, the user may consider clamping these pits. Clamping a certain segment of the pipe-length is assumed to take that segment out of the pipe-length that is liable to corrode further or be subject to breaking. The method then determines the wall thickness at the next worst corrosion pit, i.e., excluding all pits that were clamped. This new minimum wall thickness is used to calculate the distribution of the pipe-length wall thickness in block 22. Clamped areas are unlikely to fail and, therefore, the length of the pipe area that is clamped is taken out of the possible pipe-length that could fail.

Non-structural liners are useful in preventing leaks. These liners slow or stop internal corrosion rate but do not affect external corrosion. Non-structural liners stop leakage, however, whether from an internal or external pit. Non-structural liners are assumed to be internal plastic liners. They are assumed to have negligible deterioration with time with respect to their ability to prevent leaks. Therefore, the failure rate due to pitting leakage, PFC2, is considered to be zero for this option.

A structural liner may be considered to prevent leaks as well as provide additional bending strength. Structural liners are assumed to be internal plastic liners. They are also assumed to have negligible deterioration with time with respect to their ability to prevent leaks. Therefore, similar to the non-structural liner, the failure rate due to pitting leakage, PFC2, is considered to be zero for this option. However, as plastics are subject to embrittlement with time, the moment capacity of the structural liner is considered to deteriorate linearly with time until it is completely lost at the end of the liner's design life. Thus, a section modulus, $S_{s1}$, yield strength, $fy_{s1}$, and design life, $T_{s1}$, for the liner should be inputted by the user (or otherwise made available) if this option is selected. In the failure criterion used for transverse bending in block 24, the overall moment capacity is increased by the moment capacity of the structural liner.

If the failure rate for a given pipe-length is very high, the pipe-length can be replaced with a new one. The initial corrosion depth for a new pipe-length is assumed to be zero and the initial wall thickness is equal to the specified pipe-length wall thickness. The new pipe-length could either be of the same pipe material as the existing pipe or it can be a pipe of different material. If a pipe of different material is used, the corrosion rate, K, will be different from the previous value and hence must be entered by the user.

As will be appreciated from a reading of the above, the analysis is first done on a pipe-length basis and therefore failure of each pipe-length is considered individually. Factors that affect the corrosion and the failure of the pipe-length, such as the age of the pipe-length, the soil characteristics, the free field displacement, the pitting corrosion limit or leakage tolerance, etc., can be different for each pipe-length. Consequently, if some pipe-lengths have been previously replaced in the pipe section being examined, this is accounted for by specifying different ages for the replaced pipes. In addition to the pipe-length dependent inputs, some general inputs are required. These consist of input parameters such as the total time period of interest, time intervals for calculation of probability of failure, the number of pipe-lengths in the pipe section, cost values, etc. There are also a category of inputs required that relate to each repair action to be considered, e.g., repair costs, structural and corrosion characteristics associated with each option, etc. The input values have recommended ranges. If the inputs are not within these ranges warnings will be issued, but the user can continue the calculations. If the inputs are invalid, such as negative probabilities, an error message is issued and the calculations are not performed until the values are corrected.

Referring to FIGS. 4, 5A, 5B, and 6, an embodiment of logic flow 80 for use in a computer program is provided, in which aspects of the above-described method are implemented. The program is presented herein as a stand-alone system stored in a personal computer, though it may be arranged to be accessed from a server or within a local area network (LAN) configuration. The essential system arrangement requires a computer having input/output capability, memory, and a central processing unit. A user loads a computer application program formed in accordance with the present invention into the computer memory where it is available for execution. The user additionally provides one or more input files of remote field eddy current measurement data.

In a one embodiment, the computer application program is provided to the user on a floppy disk or other data storage device. The user then installs the program software in a PC having a Windows 95 or later operating system by conventional key selections such as via a Start Menu—Run command or by double-clicking a Setup file via Windows Explorer. Once the program is installed, it can be launched by double-clicking its associated icon or using other conventional means. It will be appreciated that other operating systems, and methods of installing and invoking the software may be used.

Figure 4:
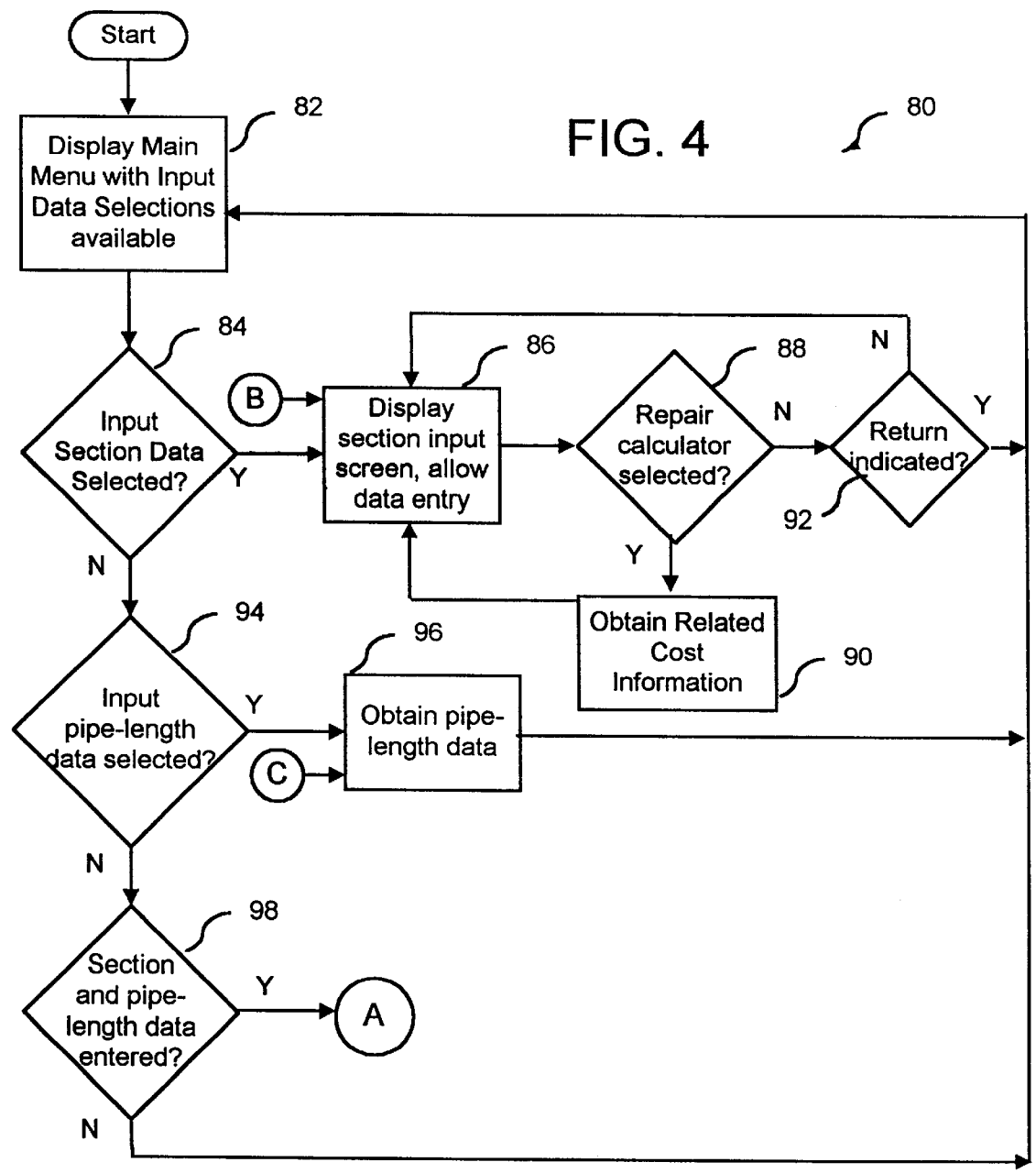
FIGS. 4, 5A, 5B, 5C, and 6 are computer process flow diagrams for defining input data and performing maintenance analysis formed in accordance with the present invention.

In FIG. 4, the logic starts at block 82 in which a Main Menu is displayed having various selectable buttons limited to the input of section data. See also FIG. 7. Once this information is entered, the Main Menu allows selection of other options, as will be described below. In FIG. 4, the logic proceeds to inquiry at 84 regarding whether input section data entry has been requested. If so, the program obtains pipe section data by displaying a section input screen (see, for example, FIG. 8) and by allowing data entry at block 86. The logic preferably allows entry of repair costs at query 88 and block 90. Selection of return at unit 92 returns the user back to the Main Menu of block 82. A button for pipe-length data input now becomes available. From the Main Menu, if the program detects the user desire to input pipe-length data at query 94, the pipe-length data is obtained at block 96. See for example FIG. 10.

Figure 5C:
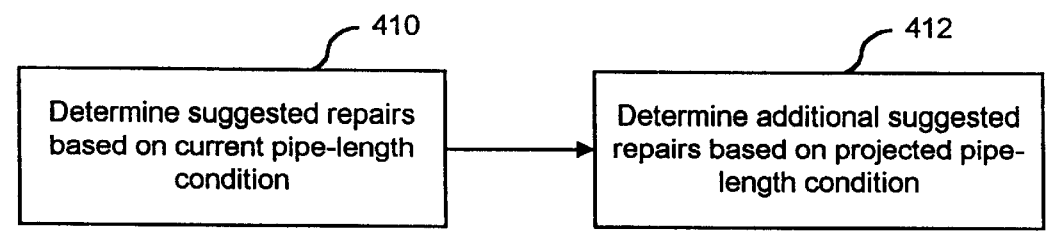
Figure 5A:
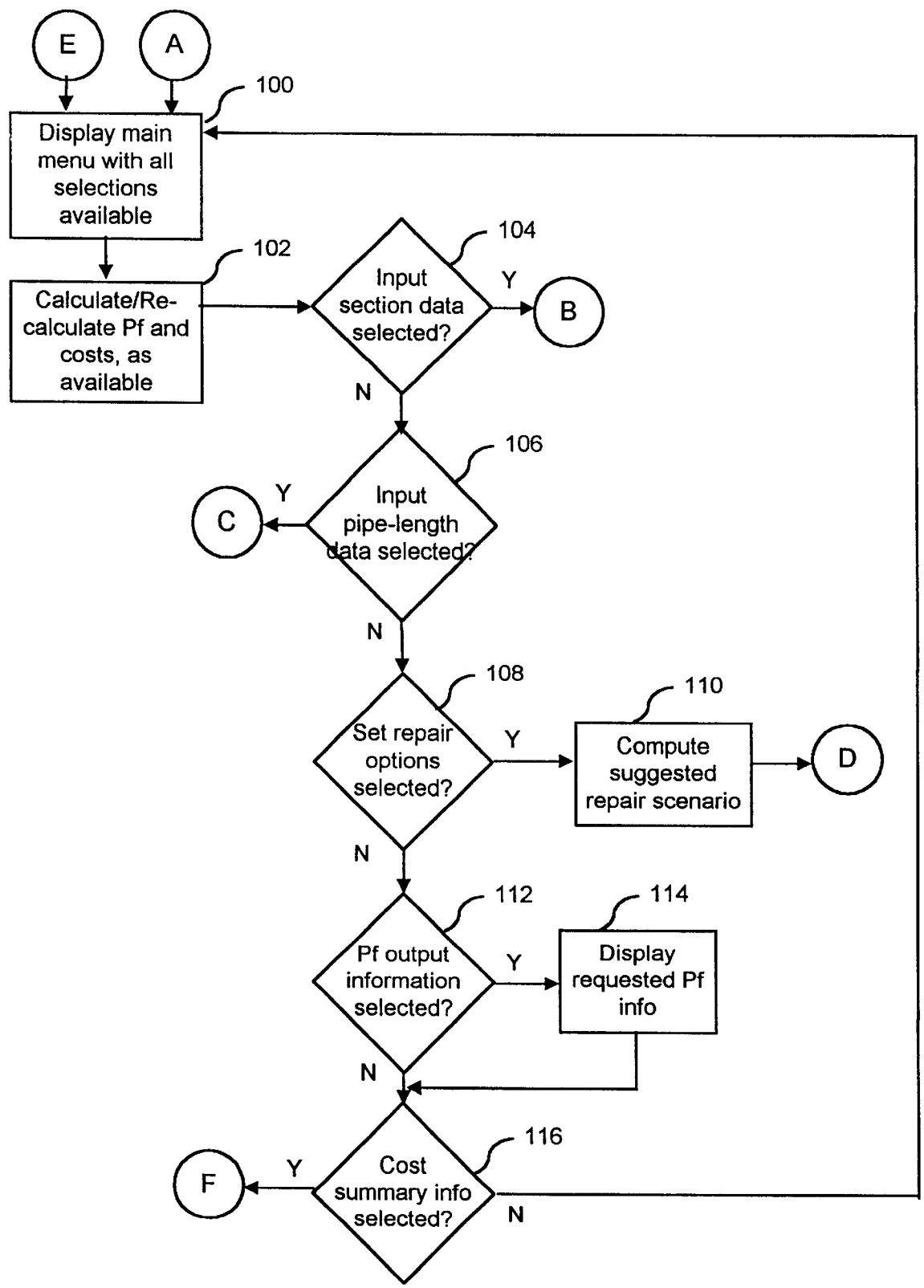

Once both the section and pipe-length data has been entered, query 98 responds by transferring logic to FIG. 5A at block 100 where the Main Menu is displayed with all options being available for user selection. Proceeding to block 102, the program calculates, or recalculates as the case may be, the probabilities of failure and their associated costs. If the user selects section data entry at query 104 or pipe-length data entry at query 106, the program returns the user to the logic of block 86 and 96, respectively.

Proceeding, the user may select an option to set repair options at query 108, resulting in the computation of a suggested repair scenario in block 110. See also FIGS. 11–15 and the logic of FIG. 5B. Referring still to FIG. 5A, if the user selects an option to output failure information at query 112, the requested output information is displayed at block 114. See also FIGS. 16–20. If the user selects an option to output cost summary information at query 116, the logic transfers to that of FIG. 6. See also displays shown in FIGS. 21–24. After obtaining requested data, the logic returns to display the Main Menu at block 100 in FIG. 5A.

Figure 5B:
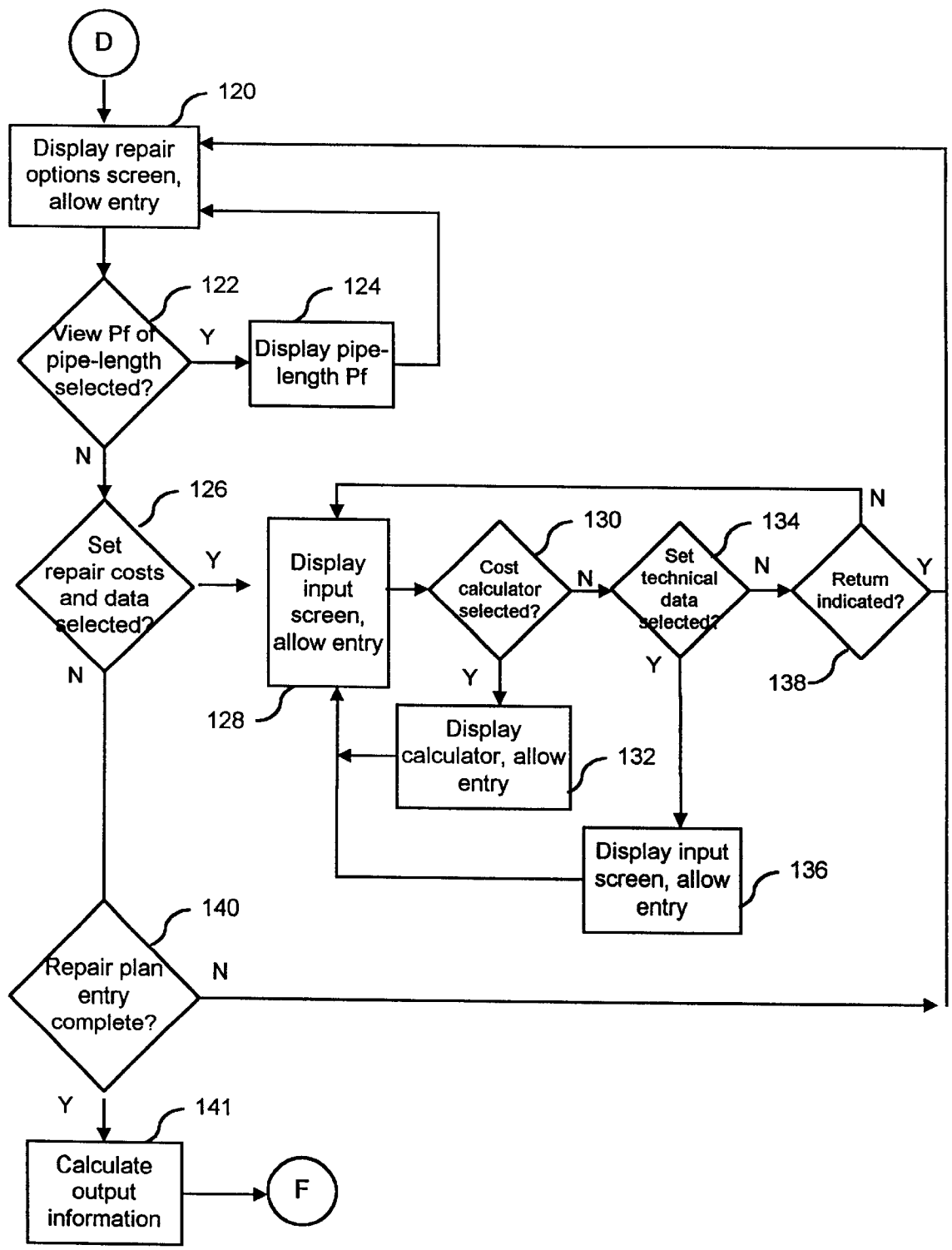

Referring to FIG. 5B, the user has requested the ability to set specific repair options from block 108 in FIG. 5A. In FIG. 5B, a display is provided at block 120 to allow entry of various desired repairs. See FIG. 11. In doing so, if the user requests to view the probability of failures at query 122, a display of such is so provided at block 124. See also FIG. 12. If the user requests to set repair costs and data information at query 126, a display of an input screen is provided to allow entry of such data at block 128. A cost calculator is selectable at query 130 to guide the user to calculate associated costs at block 132. See also FIGS. 13 and 14. The option to set various technical data is also preferably available at query 134 and block 136. See also FIGS. 13 and 15. Continuing on, once the repair plan is complete at inquiry 140, the program calculates probability of failures and associated costs at block 141 before the logic returns to the Main Menu of block 100 in FIG. 5A. If it is not complete, the logic continues to display the repair options screen at block 120 in FIG. 5B.

Decision logic used to determine suggested repair options is preferably as shown in FIG. 5C. In block 410, determination is made for each pipe-length of a suggested repair based on the current state of the pipe-length. In block 412, determination is made of additional suggested repairs based on a projected pipe-length condition at year n. In one embodiment, this logic is used to determine the suggested repair actions excluding, though, any type of liner repair. The suggested repairs for consecutive pipe-lengths are then viewed to determine whether a liner repair would be more cost efficient for groups of pipe-lengths that are either currently unsatisfactory or projected to be unsatisfactory.

In more detail, to determine whether repair should be suggested for a given pipe-length based on its current state in block 410, the pipe-length's current average wall thickness $T_{ave}$ (as estimated by the inspection device and/or measurement analysis method) is compared with a threshold average wall thickness $A_{ave}$. This may be accomplished using a data input file (or appropriate GUI) having a numeric threshold average wall thickness value or, alternatively, provided as a percentage. If the pipe-length's current average wall thickness $T_{ave}$ is greater than the threshold average wall thickness $A_{ave}$ (or some percentage times the undeteriorated wall thickness), then the pipe-length does not need repair in its current state. If this test is not passed, however, the suggested repair option for that pipe-length is to replace it.

A second check may be made for those pipe-lengths that have acceptable average wall thickness. This second check is to determine whether the pipe should be replaced due to a threat of leaking or breaking at a thin point. Thus, if the pipe-length's current minimum wall thickness $T_{min}$ (i.e., the pipe-length's deepest pit) is less than a threshold minimum wall thickness $A_{min}$, then the logic proceeds to determine whether it is more appropriate to clamp the pipe-length or simply replace it.

In one embodiment, clamping is done only if the pipe-length's deepest pit does not extend too far about the circumference of the pipe-length and the pipe-length is not riddled with further deep pits. This may be determined by checking whether the radial extent $\theta_{min}$ at the deepest pit is less than a threshold extent $A_{ext}$ and the minimum wall thickness $T_{min2}$ of the pipe-length's second deepest pit is greater than the threshold minimum wall thickness $A_{min}$ and has a radial extent $\theta_{min2}$ that is less than the threshold extent $A_{ext}$. If the above conditions are not met, the suggested repair option is to replace the pipe-length.

To determine whether repair should be suggested for a given pipe-length based on its projected state in block 412, the logic proceeds to recalculate average wall thickness $T_{ave-n}$ and pit depth $T_{min-n}$ n years into the future, for example, five years or fifteen years into the future. These calculations are accomplished in items 24 and 26 of FIGS. 2 and 3.

If the projected average wall thickness $T_{ave-n}$ is less than the threshold average wall thickness $A_{ave}$, the logic determines whether the pipe-length should be replaced or have an auger anode repair done to it. Auger anode repair is done if deterioration is primarily on a pipe-length outside diameter and if the average wall thickness in the $n_{th}$ year is greater than the threshold average wall thickness $A_{ave}$ plus some margin. If this is not the case, the pipe-length is best replaced.

As to the checking of the deepest pit, if the minimum wall thickness $T_{min-n}$ in the $n_{th}$ year is greater than a threshold wall thickness $A_{min}$ plus some margin, and the corrosion is primarily on the outside diameter of the pipe-length, the pipe-length is suggested to have an auger anode repair done to it. Otherwise, if the projected pit is small enough in extent (i.e., $\theta_{min-n}$ is less than $A_{ext}$), and the projected minimum wall thickness $T_{min2-n}$ of the pipe-length's second deepest pit is greater than the threshold minimum wall thickness $A_{min}$ and has a projected radial extent $\theta_{min2-n}$ that is less than the threshold extent $A_{ext}$, then a clamp is suggested. If neither the clamp nor the auger anode repair makes sense, the suggested repair option is to replace the pipe-length.

If both the average wall thickness and deepest pits are acceptable both in the current data and in these amounts in the $n_{th}$ year, the pipe-length is determined to be acceptable and no repair is suggested for it.

Once all pipe-lengths have been viewed to determine whether they need individual attention, a check is done to explore the possibility of doing a structural or non-structural liner instead. In one embodiment, the logic checks a group of consecutive joints to determine whether a pipe-length requires a repair option (such as an anode auger, clamp or replacement) and whether the preceding two pipe-lengths and following two pipe-lengths also require some repair action, i.e., a minimum of five consecutive pipe-lengths. If this is the case, a structural liner is recommended. Additionally, if corrosion is primarily on the inner diameter of the pipe-length, and a particular pipe-length requires a non-structural repair action (such as an auger anode or clamp), then if the preceding two pipe-lengths and the following two pipe-lengths require non-structural repair actions and the minimum extents of all pipe-lengths are less than some threshold extent, then a non-structural liner is suggested.

The user is provided with the ability to input the values of the threshold average wall thickness $A_{ave}$, threshold minimum wall thickness $A_{min}$, threshold extent $A_{ext}$, and any margins. Additionally, the user may be provided with the opportunity to specify whether the primary corrosion mechanism is in the outer diameter or the inner diameter for the line being assessed. In one embodiment, these values are provided in a dataset attached to the inspection data. In another embodiment, a GUI is provided for the user to set and alter these amounts.

Figure 6:
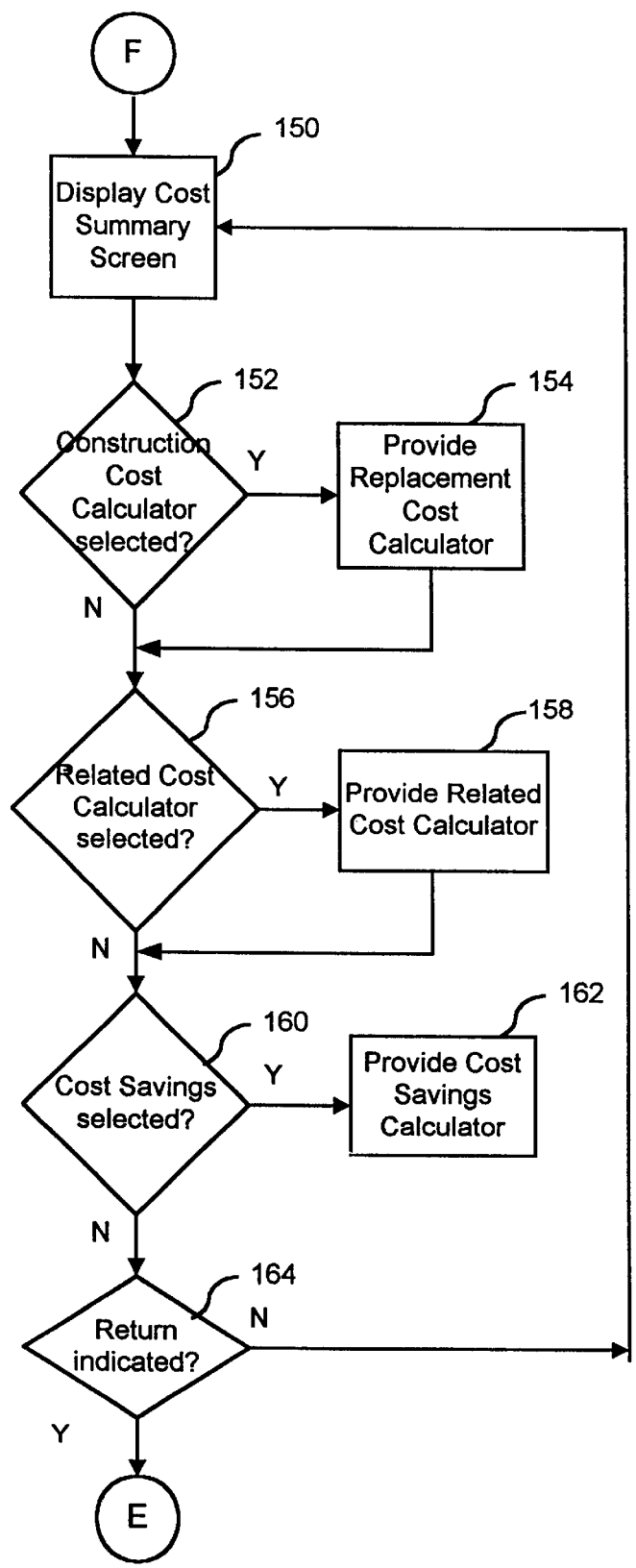

Referring back to the logic diagrams of FIGS. 5A and 6, cost summary information is invoked from block 116 and manipulated at block 150. See also FIG. 21. A construction cost calculator is available for selection at inquiry 152. Selection thereof results in the logic providing a replacement cost calculator in block 154. See also FIG. 22. A related cost calculator is available for selection at inquiry 156. Selection thereof results in the logic providing a related cost calculator in block 158. See also FIG. 23. A cost savings calculator is available for selection at inquiry 160. Selection thereof results in the logic providing a cost savings calculator in block 162. See also FIG. 24. Indication of return having been selected at inquiry 164 takes the user back to the display of the Main Menu at block 100 in FIG. 5A.

Upon activating the program, the user is provided with a graphical user interface (GUI) display screen through which the user can manipulate the data into meaningful information regarding the most cost effective maintenance option for the pipe section examined by the inspection device. The categories of repair options that may be considered correspond to that provided by the method above, preferably including no action, cathodic protection, pit repair clamping, providing a non-structural liner or a structural liner, and joint replacement. The terms "joint" and "pipe-length" (and occasionally "pipe length", for some screen displays and in some cases depending on the meaning of the sentence) are synonymous. The user can view the results of the data manipulations through various display means, e.g., monitor, printer, plotter, etc. While Visual C++™ is the preferred GUI programming language of the present invention, it will be appreciated that other event-driven GUI programming languages may be used. Further, it should be appreciated that the programming of the logic may be accomplished in an object-oriented structure or otherwise. FIGS. 7–15 illustrate data input screens. FIGS. 16–20 illustrate analysis output screens.

Figure 7:
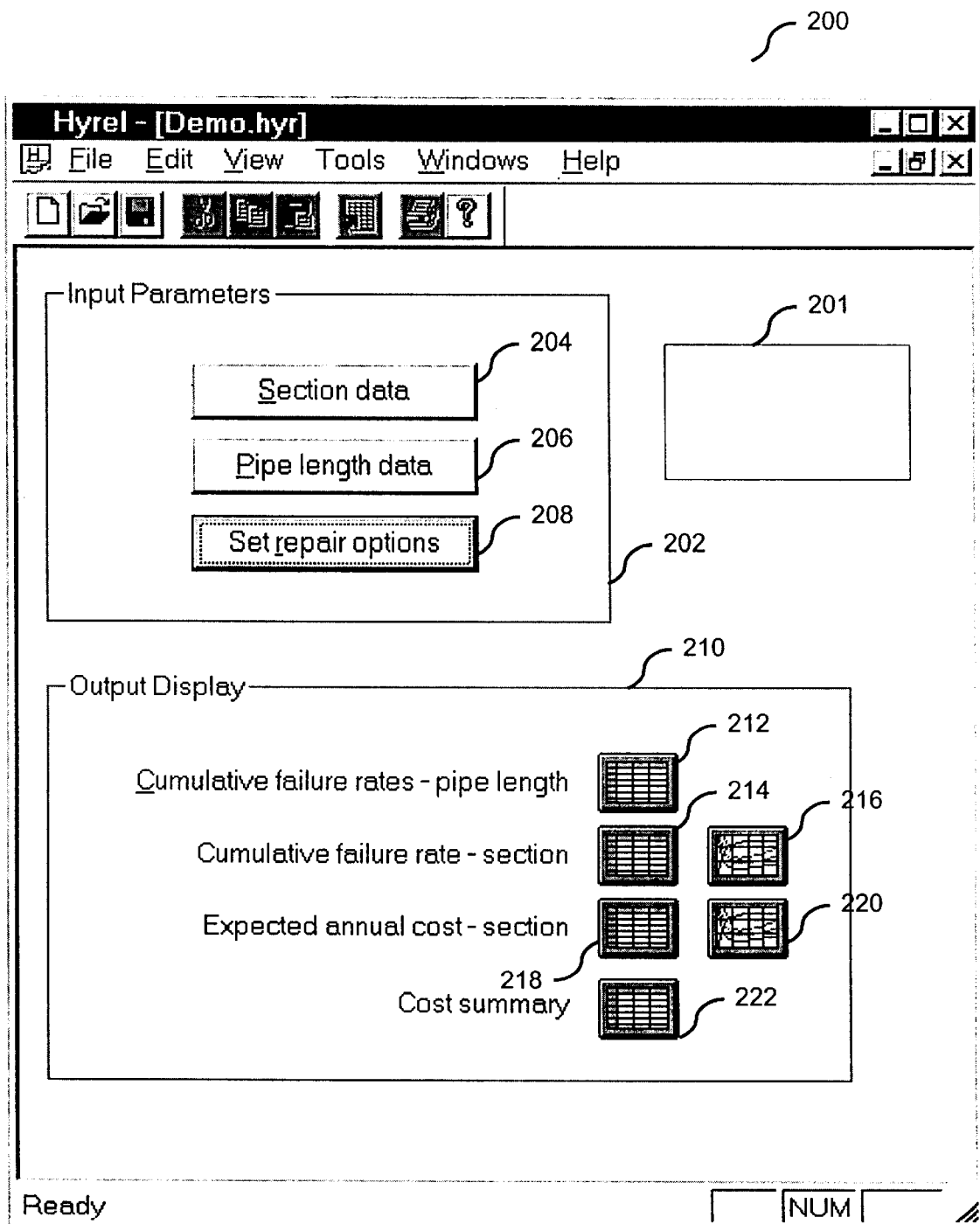

Referring to FIG. 7, upon launching the program, a display window appears having an initial main menu 200. By clicking on a menu item button (or using the keyboard to highlight an item or using some other available action), the user may enter and obtain data from the program. The menu 200 includes an input parameters box 202 and an output parameters box 210. Other information may be displayed, such as at box 201, e.g., for advertising purposes or to give instruction. The input box has three selectable buttons, Section data 204, Pipe length data 206, and Set repair options 208. Initially, only Pipe section data 204 is available for selection. The other boxes may be shaded gray to indicate their unavailability.

Selection of the Section data button 204 will lead to a separate input dialogue box, such as the one illustrated in FIG. 8. Similarly, selection of the Pipe length data button 206 will lead to the dialogue box shown in FIG. 10. Once the necessary input is supplied by the user for both the section and the individual pipe-lengths, the Set repair options button 208 is made available for selection in FIG. 7. In FIG. 7, the input data has already been entered, therefore the Set repair options button is available for selection (indicated by the dashed lines surrounding the button).

Referring to FIG. 8, general input information that is not pipe-length dependant or repair dependant is requested and can be entered in screen 226. The input parameters may include various items. A Time period for analysis 228 is the overall time period of interest. A Time interval (yrs) 230 is the smallest subinterval of time that should be used in the calculations and display of analysis results. Real Interest rate (%) 232 is the anticipated real interest rate. Annual probability of breaks due to other causes 234 and Annual probability of leaks due to other causes 236 allow the user to input probability of failures from other types of causes that are unique to that pipe section but not related to pipe conditions, e.g., geography, construction activity, etc.

Still referring to FIG. 8, a Failure cost/emergency repair cost (breaks and major leaks)($/repair) box 238 is available for allowing the user to input a cost amount for rectifying pipe failures. Emergency repairs are usually more costly than planned repairs to prevent the failure. Alternatively, the system may provide a default value, or as shown in FIG. 8, may provide the user with a separate calculation button 240. Upon selection of button 240, the user is presented with the data input screen of FIG. 9 where relevant data can be entered as described below. Lastly in FIG. 8, a Cost of a minor leak ($/yr) box 242 allows the user to enter an estimate of the cost of the lost water from an unrepaired minor leak per year. These values are used in item 26 of FIG. 3.

Referring to FIG. 9, the user may choose between calculating emergency repair costs based on doing the work themselves or subcontracting the work to others, by selecting between buttons 250 or 252. If the user chooses to calculate the emergency repair costs based on having work done by the user's own crew, various pieces of relevant information are requested. For example, in FIG. 9, information may be entered regarding the cost of services, excavation, relandscaping, damages, penalties, etc. Alternatively, the system can provide default values to the user for modification. If the user chooses to calculate the emergency repair costs based on having work contracted out, different pieces of relevant cost information are requested, e.g., subcontractor cost, insurance cost, and other fees.

In one embodiment, the program displays default information in both the areas 250 and 252. The information or the box is shaded gray to indicate that it has not been selected and is not modifiable. Once the user selects either item 250 or 252, the information is shown in a normal, unshaded mode. Selection of an OK button returns the user to the input display 226 of FIG. 8 where the total cost calculated from FIG. 9 is then displayed in box 238.

Still referring to FIG. 8, in one embodiment, default values are provided to the user to ensure non-zero values of necessary input information. Alternatively, the program may be formed to flag unacceptable entry values, such as "0" for the Time period for analysis 228, and to require the user to enter an acceptable value before proceeding. Various other selection buttons may be presented, e.g., a Print button 244, an OK button 246, and a Cancel button 248. Selection of either the OK or Cancel buttons returns the user to the main display screen 200 of FIG. 7.

Referring back to FIG. 7, selection of the Pipe length data button 206 causes the program to display the data input screen 256 of FIG. 10, though without any tabular information. The user then clicks an import button 260 to select a remote field technology measurement file name which is subsequently displayed in a read-only edit box 262. This causes the program to seek and obtain input data for a specified file in accordance with item 22 of FIG. 2.

Once imported, the program presents the input data in tabular form in screen 256, with each row representing a pipe-length and each column providing various measurement information that is labeled by a column header 264 at the top of the table. Scroll bars are provided both vertically and horizontally to enable the user to view all data. As above, various other selection buttons may be presented, e.g., Print, OK, and Cancel. Selection of either the OK or Cancel buttons returns the user to the main display screen 200 of FIG. 7.

Figure 11:
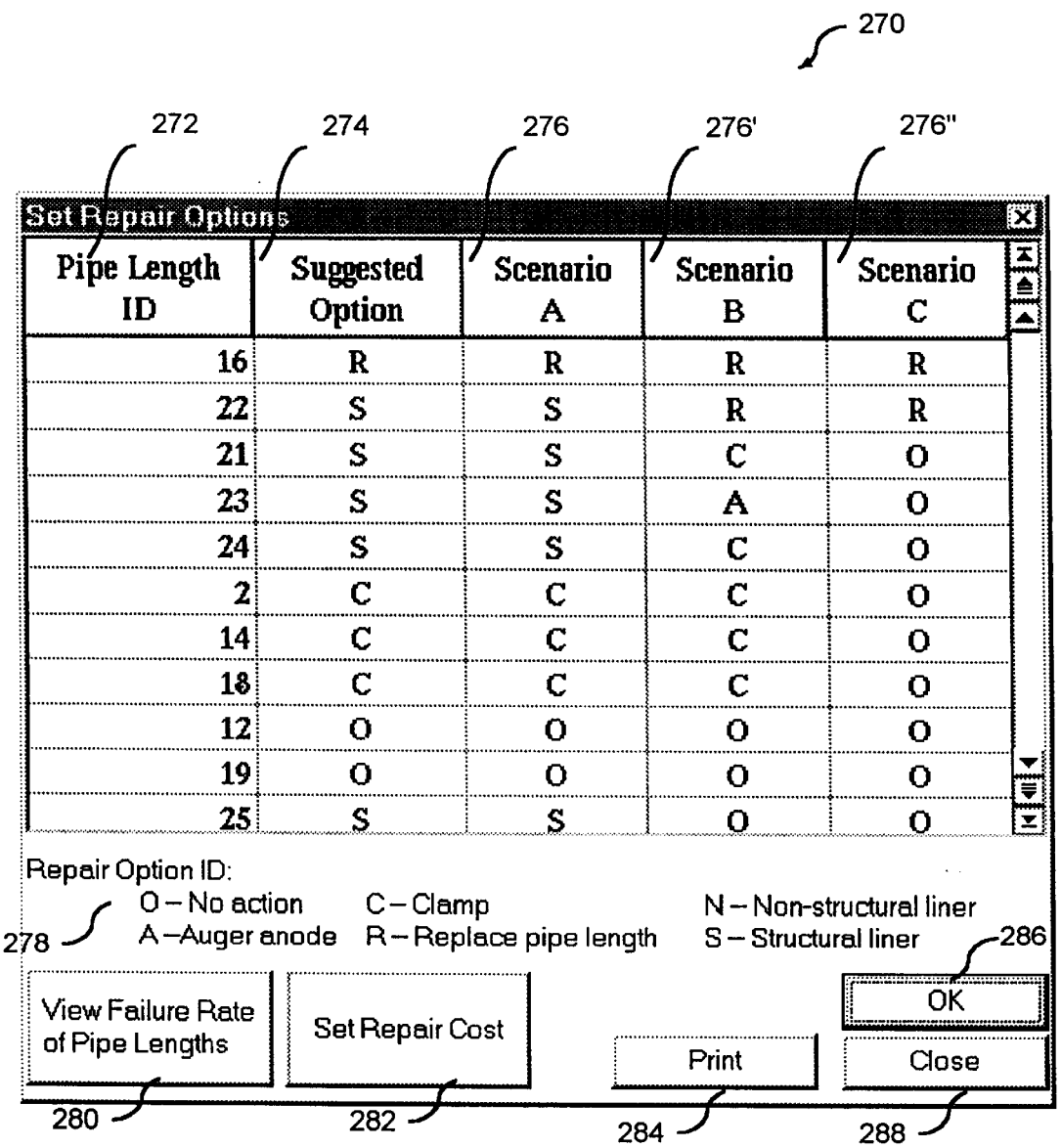

Referring back to FIG. 7, after entry of the section and pipe-length data, the user can then select the Set repair options button 208. This causes the program to display screen 270 of FIG. 11. Initially, the display 270 provides a first column 272 that identifies the pipe-lengths in order of probability of failure, the pipe-length most likely to fail being listed first. In one embodiment, the program calculates according to items 410 and 412 of FIG. 5C a suggested repair action for each pipe-length and displays the same in column 274. In FIG. 11, a legend 278 is used to define the repair options.

The display screen 270 further provides a number of columns 276, 276', 276" that can be used to define specific repair scenarios for analysis. In one embodiment, the first column 276 is the suggested repair action. Columns 276' and 276" are initially filled with the No action repair code O so that the user must enter a particular desired repair option for each pipe-length. In FIG. 11 column 276', the user has decided to analyze the pipe section with repairs for only the worst eight pipe-lengths. In column 276", the user has entered repairs for only the two worst pipe-lengths. In another embodiment, these columns 276, 276', 276" are filled with the same options as shown in the Suggest Option column 274 and the user modifies the repair plan as desired.

By providing the user with a suggested repair option, the present invention provides an excellent starting point for analyzing the associated costs of maintaining and repairing the pipe section. By allowing the user to enter a number of desired repair scenarios, the present invention allows that person to easily and quickly prepare trade studies for comparison (as described below.) These features give the user a powerful competitive advantage. In FIG. 11, a Print button 284, OK button 286, and Close button 288 are available for selection. Hitting either OK 286 or Close 288 will return the user to the Main Menu 200.

In the embodiment of FIG. 11 the legend 278 has six choices: O-No action, A-Auger anode, C-Clamp, R-Replace pipe length, N-Non-structural liner, and S-Structural liner. No action means the probability of failure for that pipe-length will be as originally calculated by the program, i.e., in accordance with item 26 of FIG. 3. No action would be selected if the probability of pipe-length failure was relatively or acceptably low. Auger anode, a type of cathodic protection, would be used if the user thought a pipe-length was currently acceptable, but likely to corrode and lead to either a leak or a break. Clamping is used for a localized pit. Replacement is used for a pipe-length having widespread damage. Non-structural liners are effective for leaks only, and structural liners can be used for pipe-lengths trending toward both leaks and breaks.

Still referring to FIG. 11, a selectable button 280 is available for the user to view the failure rates of the pipe-lengths in order of worst to best probability of failures. Upon selection of button 280, the display screen changes to that of FIG. 12 table 290. Each row represents a pipe-length. Numerous columns show the various probabilities of failure for that pipe-length. In FIG. 12, various failure rate information is shown as calculated in item 26 of FIG. 3, including a total initial cumulative failure rate 292, initial cumulative failure rates due to leaks 296 and breaks 294, a total cumulative failure rate for the overall years 298, cumulative failure rates due to leaks 302 and breaks 300 for the overall years.

The information of FIG. 12 is valuable in helping the user decide what types of repairs would be best for a given pipe-length problem. The higher the probability of failure for a leak, the more likely that the pipe-length has an appreciable pit. The higher the probability of failure for a break, the more likely that the pipe-length has a wall thickness distribution problem that may cause a break due to beam loading. The user can then select repair options based on the knowledge obtained from FIG. 12.

In order to calculate the cost of a selected repair and the new probability of failure for each pipe-length to which the selected repair is applied, the program requires the user to enter certain information prior to allowing the selection of an OK button in FIG. 11. Referring back to FIG. 11, this information is entered by selecting a Set Repair Cost button 282. Selection results in the display screen 306 of FIG. 13.

Figure 13:
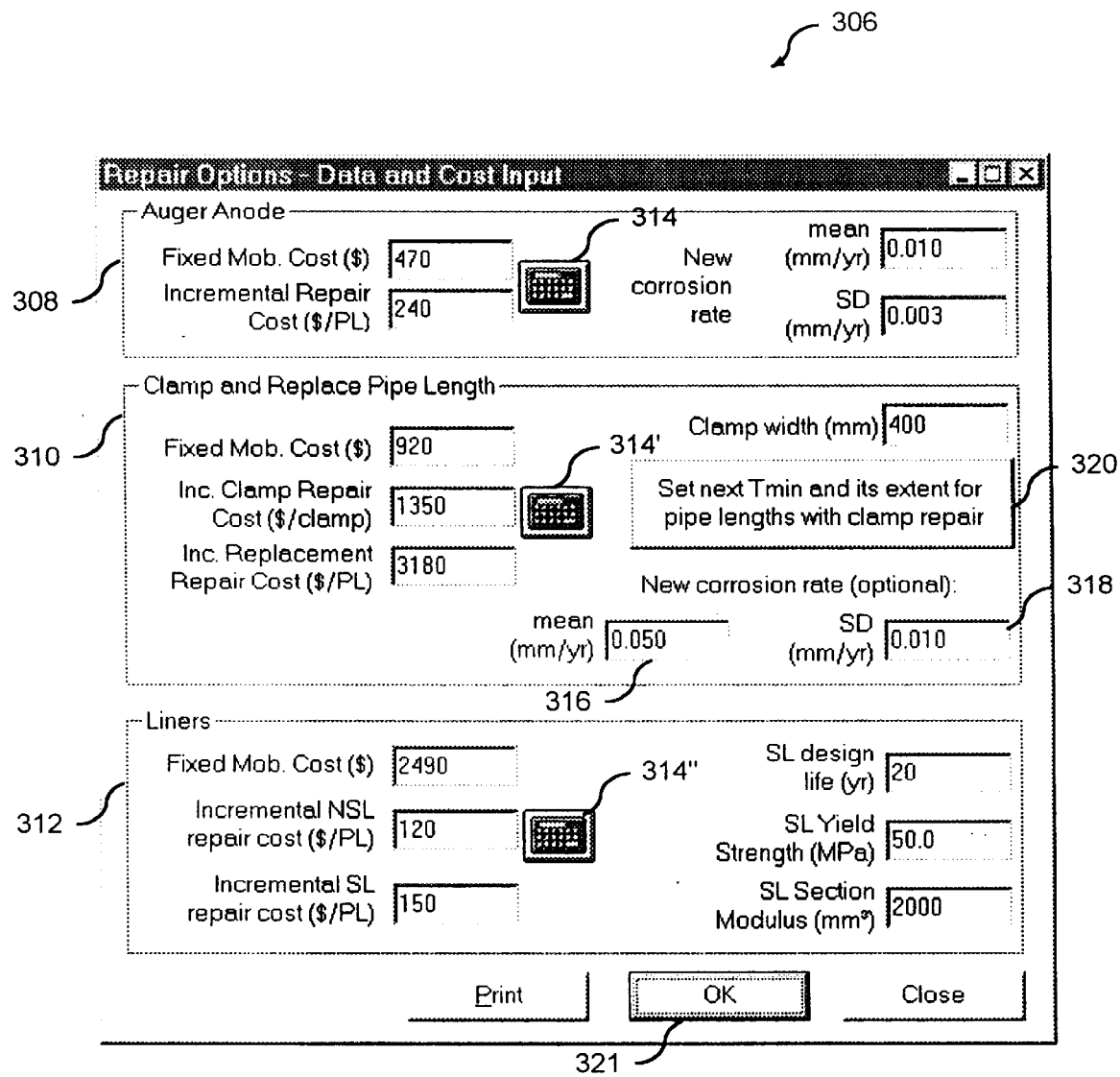
Figure 15:
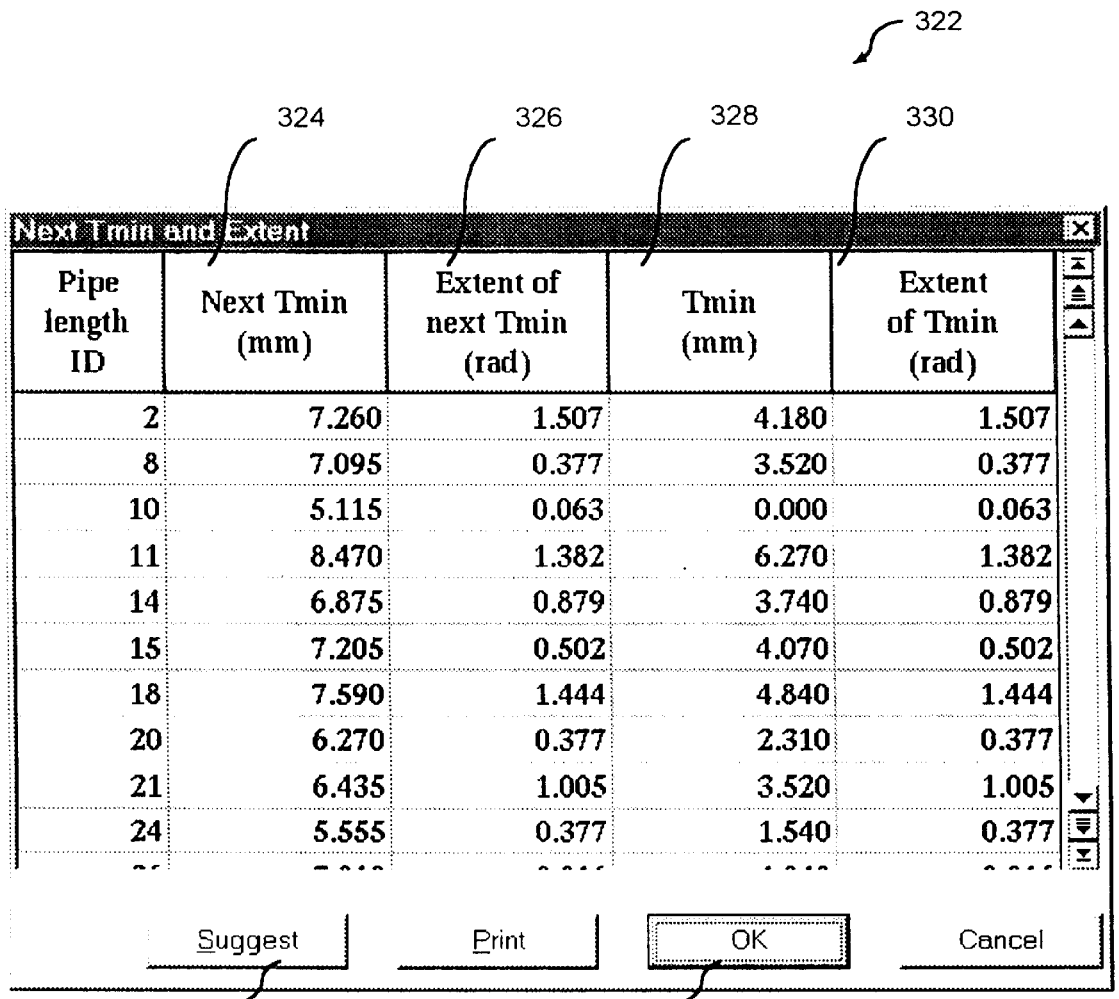

In the embodiment of FIG. 13, the cost values are provided to the user based on the assumptions shown in FIG. 14. FIG. 13 includes three main sections. One section 308 is in regard to auger anode (cathodic) repairs. Another section 310 is in regard to Clamp and pipe-length replacement data. Another section 312 is for Liner data. The auger anode area 308 shows various cost information (such as fixed mobilization cost and an incremental repair cost per pipe-length) and new corrosion rate information (such as a mean corrosion rate in distance per year and standard deviation of the new corrosion rate). The user can alter this information by moving the cursor to one of the cost information boxes or by selecting a calculator button 314. Either action brings up a display screen shown in FIG. 14 and described below.

In FIG. 13 the clamp and replace pipe-length area 310 shows various cost information (such as fixed mobilization cost, incremental clamp repair cost per clamp, and incremental replacement repair cost per pipe-length) and clamp dimension data (such as clamp width). An optional entry area is provided for the user to update the mean corrosion rate 316 and standard deviation 318 for the replacement option. As above, the user can alter the cost information by moving the cursor to one of the cost information boxes or by selecting a calculator button 314' to bring up the display screen of FIG. 14.

If the user has selected the clamp option C in display screen 270 of FIG. 11, a selectable button 320 is made available in screen 306 of FIG. 13. Selection of button 320 provides display screen 322 of FIG. 15 in which a table lists all pipe-lengths that were given a clamp repair option under any repair plan shown in screen 270 of FIG. 11, shown in order of increasing pipe-length identification. The display screen 322 also provides for each pipe-length the minimum pipe-length thickness 328 and extent thereof 330.

The user can enter a new minimum pipe-length thickness in column 324 for each pipe-length and extent thereof 326, or the user can select a Suggest button 332 and the program will estimate default values based on the average between the average wall thickness (shown in the display of FIG. 10 as "Tav of pipe length (mm)") and the minimum wall thickness given in column 328. The extent in column 326 is assumed to be the same as that in column 330 for each pipe-length. The information in screen 322 is used by the program at item 22 in FIG. 2 before the calculation of new probabilities of failure for clamp repaired pipe-lengths. Other methods of calculating or obtaining new values may be used. Selection of an OK button 334 returns the user to the screen 306 of FIG. 13.

Continuing on in FIG. 13, the liner area 312 shows various cost information (such as fixed mobilization cost, incremental non-structural liner repair cost per pipe-length, and incremental structural repair cost per pipe-length) and structural liner technical data (such as design life in years, yield strength, and section modulus). As above, the user can alter the cost information by moving the cursor to one of the cost information boxes or by selecting a calculator button 314" to bring up the display screen of FIG. 14.

Referring to FIG. 14, there are two sections, one at 340 to allow modification of the repair cost data based on the user doing the work, the other at .342 based on the work, being subcontracted out. Which data entry slots are available for modification depends on how the user arrived at this screen. For example, if the user selected the button 314' of the clamp area 310 in screen 306 of FIG. 13, then the clamp data edit boxes of the area 340 are modifiable. If the user selected button 314", then the liner data edit boxes would be modifiable; if button 314, then the auger anode data edit boxes.

Various types of cost information may be entered in area 340. In the embodiment of FIG. 14, there are labor charges, equipment charges, general and administrative allocation costs, and materials costs. The summation of these amounts is the total cost that is provided to the user in screen 306 of FIG. 13. The data entry area 342 is shown in FIG. 14 as a simple calculation of subcontractor and related costs on a fixed cost per site basis, an incremental cost to install clamps per pipe-length, and an incremental cost to replace each pipe-length.

In one embodiment, default data is provided in FIG. 14. The user can either use default data or enter new data. Selection of an OK button 344 returns the user to screen 306 of FIG. 13. Once the necessary information is shown in screen 306 of FIG. 13, an OK button 321 becomes selectable. Selection thereof returns the user to screen 270 of FIG. 11. Once the necessary information is provided in screen 270 of FIG. 11, an OK button 286 becomes selectable. Selection thereof returns the user to the main menu screen 200 of FIG. 7. Since all necessary data is available, the program calculates the output information accordingly (such as shown in item 26 of FIG. 3) and makes the buttons of the output display area 210 selectable.

Referring back to FIG. 7, failure rate and cost information is now available to the user in tabular and graphical form. In one embodiment, cumulative failure rates per each pipe-length are available for viewing by selecting icon 212. Selection of button 212 provides the user with a table display 400 such as the one shown in FIG. 16. Cumulative failure rate of the pipe section may be viewed in table form by selecting button 214, or in graphical form by selecting button 216. Selection of button 214 results in the display of a table such as table 420 shown in FIG. 17. Selection of button 216 results in the display of a graph such as graph 440 shown in FIG. 18. Selection of a button 218 in the main menu results in a tabular display of expected annual cost for the pipe section, such as table 460 shown in FIG. 19. Selection of button 220 in the main menu results in its graphical display, such as graph 480 shown in FIG. 20. Selection of button 222 results in a tabular display summarizing costs, such as table 500 shown in FIG. 21. The data in the display screens in FIGS. 16–21 is not user modifiable.

In one embodiment, table 400 of FIG. 16 lists each pipe-length and the probability of failure for that pipe-length for each of the repair scenarios of display screen 270 in FIG. 11. This is repeated over the time period given in box 228 of FIG. 8, incremented by the interval amount in box 230. In addition, the probability of failure due to breaking and the probability due to major leaks are also provided. For example, in FIG. 16, pipe-length 1 was not selected for repair. Therefore, the potential for breakage shown in the "No Action Break" column is the same value as the potential in repair Scenarios A, B, and C. As would be expected, the probability of failure increases as time increases.

Figure 17:
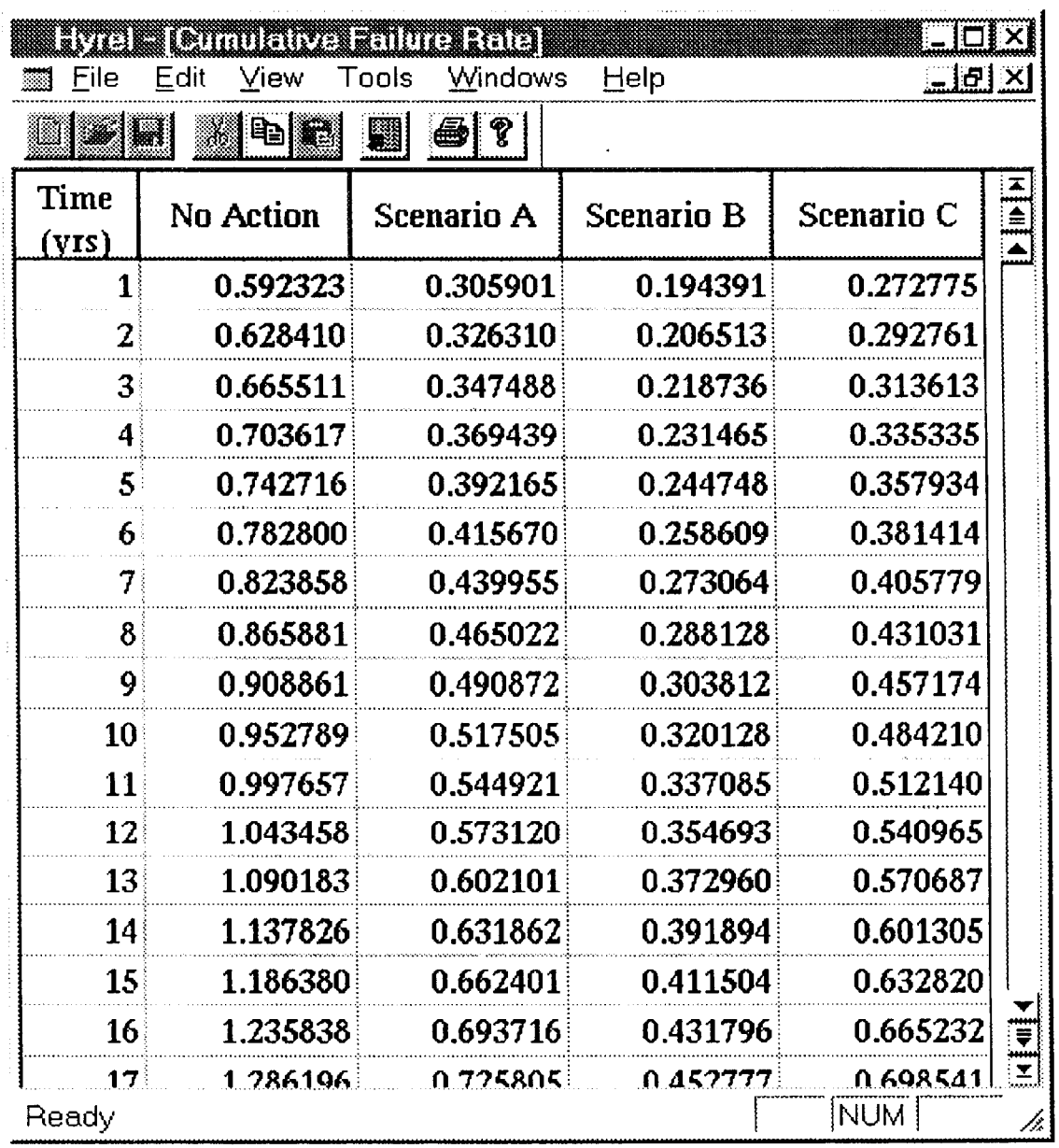

Referring to FIG. 17, the cumulative rate of failure for the pipe section is provided for each repair scenario as the summation of the cumulative probability of failures for each of the individual pipe-lengths. Thus, the value "0.703617" in year 4 for the "No Action" column represents the summation of the cumulative probabilities of failure for all 29 pipe-lengths if nothing is done to the pipe section (the number of pipe-lengths was provided by the input data and shown in box 258 of FIG. 10). As shown in FIG. 11, repair Scenario A was the suggested repair plan. In FIG. 17, Scenario A shows a lessening of probability of failure for the overall pipe section relative to the No Action case.

Figure 18:
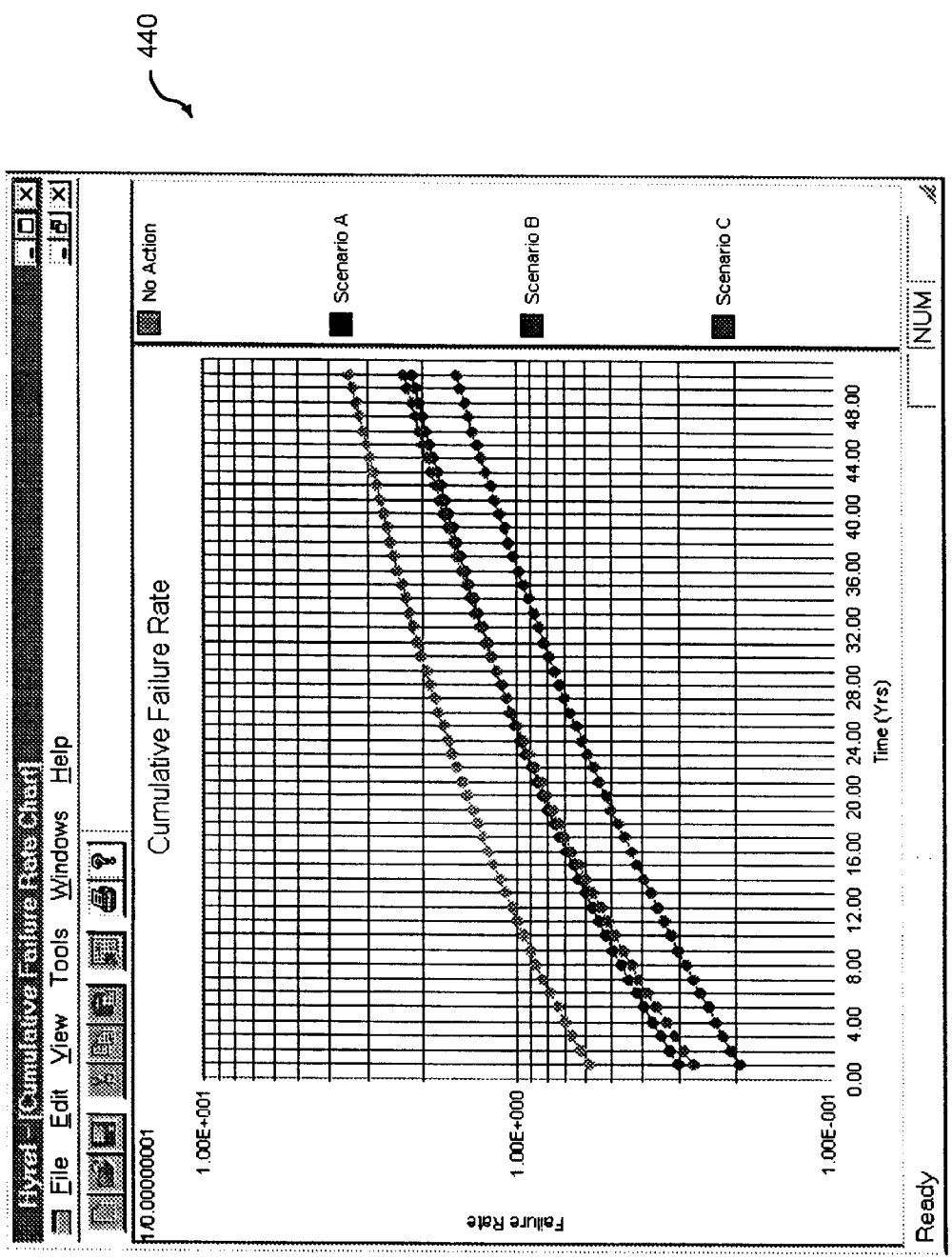

Referring to FIG. 18, the cumulative rate of failure for the pipe section is displayed in graphical form upon selection of button 216 in the main menu. This graphical representation allows the user to quickly see that the repair plan of Scenario C results in the smallest cumulative failure rate at any given time. As expected, the No Action plan results in the highest probability of failure at any given time.

Figure 19:
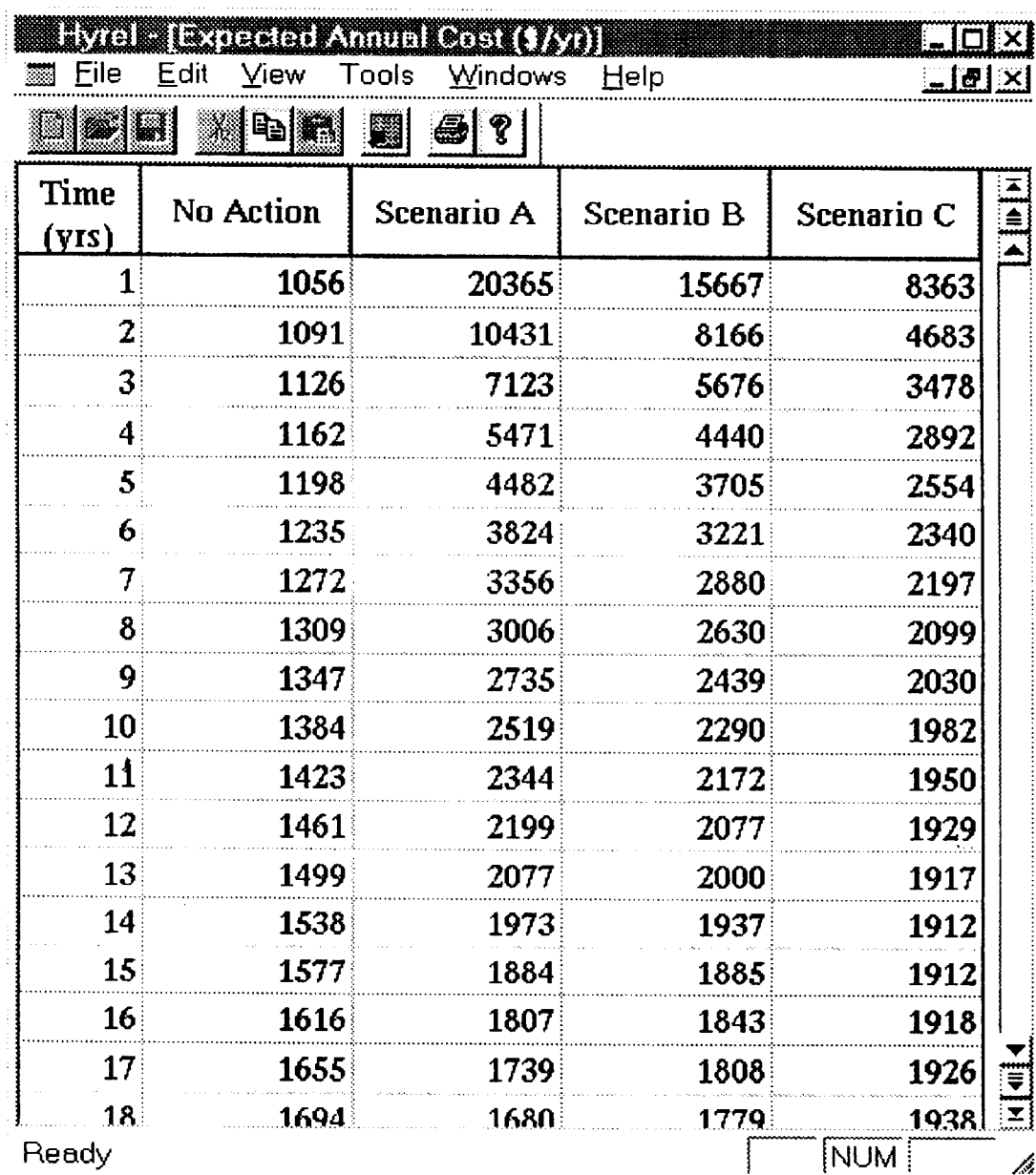

Referring to FIG. 19, the expected annual cost for the pipe section is calculated and is displayed in table form for each repair plan. In one embodiment, the expected annual cost for the pipe section for the No Action case is calculated as the average cost of failures due to breaks and major leaks plus lost water due to minor leaks within the given time period.

The expected annual cost for the pipe section for the other repair scenarios is calculated as the total repair cost amortized over the accumulated time interval plus the expected failure and minor leak costs in that time. The expected failure costs are calculated according to item 64 in FIG. 3.

Figure 20:
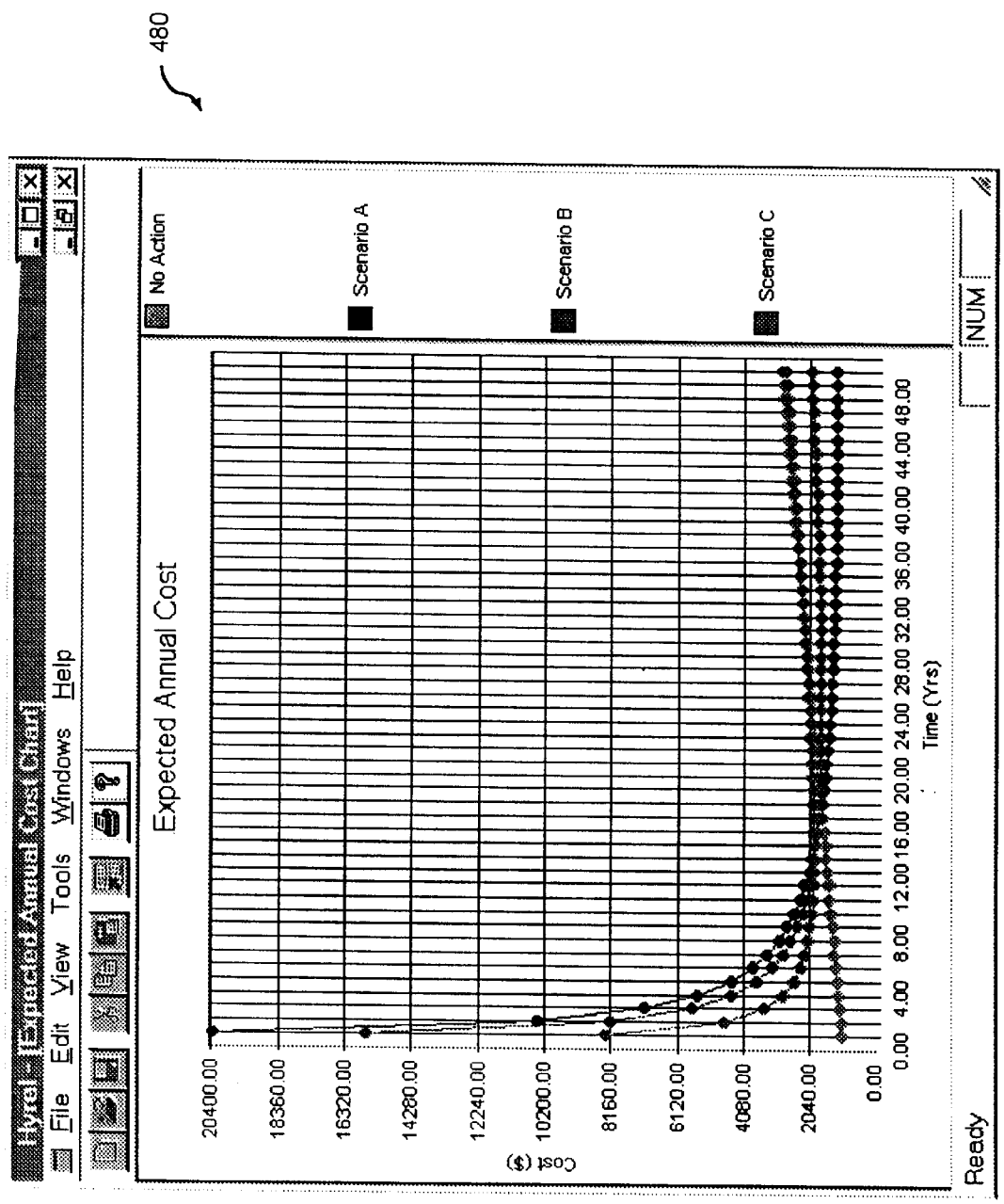

This same information is shown in graphical form in FIG. 20. In deciding which repair plan to do, the user can compare the cost of a given repair plan with the effectiveness of that plan in avoiding pipe section failures. In viewing FIG. 20, the user will look for the lowest cost in a given time span. For example, if the time span of interest were less than 18 years, then No Action would be the best selection. If the time span of interest was over 18 years, the repair Scenario A would be the best selection. The optimum period of time at which the next maintenance event should be undertaken can be identified as the time interval leading to a minimum annual cost for a specific repair plan.

The display screen 500 of FIG. 21 summarizes various pieces of related accounting cost information for a whole pipe section replacement in column 502, for No Action in column 504, and for Repair Scenarios A, B, and C in columns 506, 506', and 506", respectively. Cost information includes Construction cost in row 508, Related costs, such as social costs, in row 510, Expected failure cost in row 512, Life cycle savings in row 514, and Total cost in row 516. Portions of the information in FIG. 21 may be modified by selecting buttons 518, 520, or 522.

Figure 22:
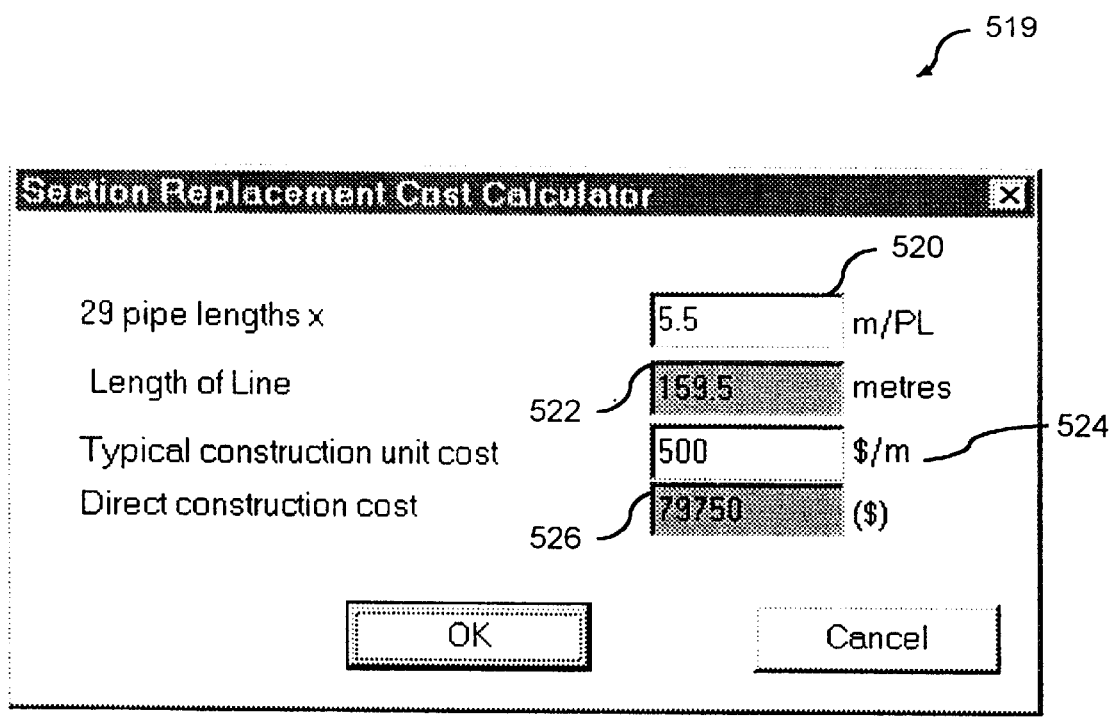

Selection of button 518 causes the program to display a section replacement cost calculator 519, such as the one shown in FIG. 22. The user can enter the average length of the pipe-lengths at box 520. The program calculates the total length of the pipe section line and displays the information in box 522. The user can enter a construction unit cost at entry box 524, wherein the program will multiply this amount by the total length of the pipe section line and display the result in box 526. Selecting an OK button returns the user to the cost summary chart 500 of FIG. 21.

Selection of button 520 in FIG. 21 causes the program to display a related cost calculator 530, such as the one shown in FIG. 23. Here, the user can enter the social costs associated with each repair scenario (other than No Action which is assumed to incur no social costs). The user may enter the annual business revenue volume per block, its gross profit margin, the business tax rate, the traffic volume, and vehicle operating costs. The user may also enter the number of blocks disrupted by pipe section work construction, number of days of disruption, traffic detour length, and days of detour. Based on this information, the program calculates lost business profit as the number of blocks disrupted by construction multiplied by the annual revenue volume per block and the gross profit margin and the number of days of disruption divided by 365 days. The program calculates the lost government business tax as the tax rate multiplied by the lost business profit. A cost to vehicle owners is the vehicle operating cost times the traffic volume times the traffic detour length times the days detoured. The total (social) related costs are then calculated based on these amounts.

Selection of button 522 in FIG. 21 causes the program to display a life cycle savings calculator 540, such as the one shown in FIG. 24. The user can enter various pieces of life cycle data related to the cost of lost water due to minor leaks (i.e., below the threshold precipitating an emergency repair) and the savings realized by undertaking one of the defined repair scenarios. In the embodiment of FIG. 24, the user can enter an estimated water loss from the existing pipe section as a volume per year. The user may also enter the cost of water treatment per volume or the retail price of water. Thus, the owner may choose to value the lost water at either the marginal production cost (treatment cost) or the full value of lost revenues (retail price). The user may also enter the estimated reduction of water loss per year and the number of years the loss is eliminated. The program then displays either the saved treatment costs or the recaptured retail revenues. Other savings may be entered at the user's discretion for unique circumstances.

Referring back to FIG. 21, the expected failure costs shown in row 512 are calculated as the summation of all the failure and minor leak costs in each of Section Replacement, No Action, and repair scenarios of FIG. 19. The information in row 512 in FIG. 21 is not modifiable by the user.

In one embodiment, any of the output windows can be kept open while the input parameters are changed and the output is updated. Selecting the OK button of the repair option inputs screen 270 of FIG. 11 will result in the program automatically updating the output data and updating the displays in the open output screens. The graphs may be zoomed in to by specifying a zoom area using the mouse. The coordinates of the plots can be obtained by clicking the relevant point.

As will be appreciated from a reading of the above, the present invention provides the user with many options regarding maintenance and repair of a pipe section. Since each repair action would reduce the failure rate of the pipe for a given cost, the present invention quantifies the likelihood of pipe failure and allows the user to subsequently weigh the probable cost of failure against the maintenance and repair costs. This can be done for each maintenance option specified by the user. The present invention thus provides the information needed for a user to identify the best option.

While the preferred embodiment of the invention has been illustrated and described, it will be appreciated that various changes can be made therein without departing from the spirit and scope of the invention. For example, the accuracy of any analysis is partially dependent on the validity of its associated assumptions. The embodiments of the invention that are described herein use relatively few assumptions and only approximate analysis calculations. The general model may be refined by incorporating further detail. In addition, in the embodiment described above, the cost evaluation takes failure rates into account using deterministic cost parameters. Costs could also be input as statistical distributions.

The embodiments of the invention in which an exclusive property or privilege is claimed are defined as follows:

1. A method of determining optimal repair options for cast iron and ductile iron water or wastewater pipe sections having a number of pipe-lengths, which have been inspected using a pipe wall thickness measurement device, the method comprises of computer-implemented steps of:
   (a) inputting measured pipe-length wall dimensional data, geometric and materials properties of the pipe-length, tool measurement errors, and analysis parameters;
   (b) determining pipe failure rates for current and future times based on the input data, by determining probability of pipe-length failure due to leaks through corrosion pits and determining probability of pipe-length failure due to transverse bending of a corroded pipe-length;
   (c) defining at least one repair scenario for the pipe section and determining pipe failure rates for the at least one defined repair scenario; and (d) providing the pipe failure rate determinations to the user as output information.

2. The method according to claim 1, wherein the repair scenario includes repair options of at least one of pipe-length replacement, auger anode protection, pit clamping, structural liner, and non-structural liner.

3. The method according to claim 1, wherein defining the at least one repair scenario includes allowing the user to define at least one repair option for at least one pipe-length.

4. The method according to claim 3, wherein prior to the user defining the at least one repair scenario, the user is provided with a ranked list of the pipe-lengths having the worst failure rates.

5. The method according to claim 3, wherein prior to the user defining the at least one repair scenario, the user is provided with a set of suggested repair options based on a predefined selection logic.

6. The method according to claim 1, further including calculating total expected annual costs of the pipe section based on the pipe failure rates of unrepaired pipe-lengths and providing the total expected annual costs to the user as output information.

7. The method according to claim 6, wherein calculating total expected annual costs includes calculating an average cost of failures due to breaks and major leaks based on predefined emergency repair costs.

8. The method according to claim 6, further including calculating total expected annual costs for each repair scenario based on the pipe failure rates of the repaired pipe-lengths and providing the total expected annual costs to the user as output information.

9. The method according to claim 8, wherein the total expected annual costs for the at least one defined repair scenario is a function of predefined repair costs.

10. The method according to claim 8, wherein the expected annual cost information includes amortized repair option costs as well as reactive failure costs.

11. The method of claim 9, wherein preparing repair cost information includes calculating maintenance cost information.

12. The method according to claim 1, wherein the repair scenario includes repair options of at least one of auger anode protection, pit clamping, structural liner, and non-structural liner.

13. The method according to claim 1, wherein the probability of failure due to transverse bending includes consideration of the bending resistance of the pipe length and consideration of an estimated loading moment applied to the pipe-length.

14. A method of determining optimal repair options for cast iron and ductile iron water or wastewater pipe sections having a number of pipe-lengths, which have been inspected using a pipe wall thickness measurement device, the method comprises the computer-implemented steps of:

(a) inputting measured pipe-length wall dimensional data, geometric and materials properties of the pipe-length, tool measurement errors, and analysis parameters;

(b) determining pipe failure rates for current and future times based on the input data, by determining probability of pipe-length failure due to leaks through corrosion pits and determining probability of pipe-length failure due to transverse bending of a corroded pipe-length;

(c) defining at least one repair scenario for the pipe section and determining pipe failure rates for the at least one defined repair scenario; and (d) providing the pipe failure rate determinations to the user as output information;

wherein defining the at least one repair scenario includes allowing the user to define at least one repair option for at least one pipe-length;

wherein, prior to the user defining the at least one repair scenario, the user is provided with a set of suggested repair options based on a predefined selection logic; and wherein the predefined selection logic compares an estimated average wall thickness of each pipe-length to a threshold average wall thickness amount to identify one or more repair options appropriate for the overall condition of the pipe-length.

15. The method according to claim 14, wherein the predefined selection logic compares an estimated minimum wall thickness of each pipe-length to a threshold minimum thickness amount and compares an estimated radial extent at the pipe-length location having the estimated minimum wall thickness to a threshold radial extent to identify one or more repair options appropriate for that pipe-length.

16. A method of remodeling pipe-length wall thickness comprising:

(a) representing, the wall thickness of the pipe-length as the thickness of the elements of a grid covering the surface of the pipe-length; and (b) assigning a probabilistic variable thickness to each element in the grid;

wherein the size of the grid elements are determined by a radial extent of the worst corrosion pit and axial resolution of the tool.

17. A method of modeling pipe length wall thickness comprising:

(a) representing the wall thickness of the pipe-length as the thickness of the elements of a grid covering the surface of the pipe-length;

(b) assigning a probabilistic variable thickness to each element in the grid; and (c) supplying desired repair information and determining the effect of the repair on the pipe-length wall thickness by adjusting the parameters of the probabilistic variable wall thickness according to the repair information.

18. In a computer system having a graphical user interface including a display and a user interface selection device, a method comprising the steps of:

(a) displaying a menu having selections of input pipe data, set pipe repair options, and display pipe output information;

(b) receiving instruction from the user to input pipe data and in response inputting pipe wall dimensional data;

(c) receiving instruction from the user to set pipe repair options and in response defining at least one repair scenario for the pipe section;

(d) determining pipe failure rates for the at least one defined repair scenario, including determining pipe failure rates for current and future times based on the wall dimensional input data; and (e) receiving instruction from the user to output the pipe failure rates and in response displaying the pipe failure rates;

wherein determining pipe failure rates includes determining probability of pipe failure due to leaks from pit perforation and determining probability of pipe failure due to transverse bending.

19. The method according to claim 18, wherein the menu provides for the input of analysis parameters including soil properties and dynamic loads properties.

20. The method according to claim 18, wherein inputting pipe wall dimensional data includes allowing the user to select an import file with the desired pipe wall dimensional data and reading the data from the import file.

21. The method according to claim 18, wherein the repair scenario includes repair options of at least one of no action, pipe-length replacement, auger anode protection, pit clamping, structural liner, and non-structural liner.

22. The method according to claim 21, wherein defining at least one repair scenario includes allowing the user to define one or more repair options.

23. The method according to claim 21, wherein defining at least one repair scenario includes providing the user with a ranked list of pipe-lengths having the worst failure rates and allowing the user to define the at least one repair scenario.

24. The method according to claim 21, wherein prior to allowing the user to define at least one repair scenario, the user is assisted in selecting repair options by providing the user with a set of suggested repair options based on a predefined selection logic.

25. The method according to claim 18, further including calculating annual costs based on the pipe failure rates of unrepaired pipe-lengths, calculating comparative annual costs based on the failure rates for the at least one defined repair scenario plus the authotized costs of the repair options, and providing the costs to the user as output information.

26. The method according to claim 25, further including social costs as an additional component of failure costs and repair option costs to allow the user to make a wholistic assessment of the least cost option.

27. The method according to claim 26, wherein the social costs include at least one of costs to homeowners, businesses, and vehicle drivers disrupted by at least one of pipe failure and construction activity.

28. The method according to claim 18, wherein the repair scenario includes repair options of at least one of auger anode protection, pit clamping, structural liner, and non-structural liner.

29. In a computer system having a graphical user interface including a display and a user interface selection device, a method comprising the steps of:
(a) displaying a menu having selections of input pipe data, set pipe repair options, and display pipe output information;
(b) receiving instruction from the user to input pipe data and in response inputting pipe wall dimensional data;
(c) receiving instruction from the user to set pipe repair options and in response defining at least one repair scenario for the pipe section;
(d) determining pipe failure rates for the at least one defined repair scenario, including determining pipe failure rates for current and future times based on the wall dimensional input data; and
(e) receiving instruction from the user to output the pipe failure rates and in response displaying the pipe failure rates;
wherein the repair scenario includes repair options of at least one of no action, pipe-length replacement auger anode protection, pit clamping, structural liner, and nonstructural liner;
wherein, prior to allowing the user to define at least one repair scenario, the user is assisted in selecting repair options by providing the user with a set of suggested repair options based on a predefined selection logic; and
wherein the predefined selection logic compares the measured remaining wall thickness and radial extent of the worst corrosion pit to threshold amounts to identify one or more repair options appropriate for the localized pitting in the pipe-length.

30. In a computer system having a graphical user interface including a display and a user interface selection device, a method comprising the steps of:
(a) displaying a menu having selections of input pipe data, set pipe repair options, and display pipe output information;
(b) receiving instruction from the user to input pipe data and in response inputting pipe wall dimensional data;
(c) receiving instruction from the user to set pipe repair options and in response defining at least one repair scenario for the pipe section;
(d) determining pipe failure rates for the at least one defined repair scenario, including determining pipe failure rates for current and future times based on the wall dimensional input data; and
(e) receiving instruction from the user to output the pipe failure rates and in response displaying the pipe failure rates;
wherein the repair scenario includes repair options of at least one of no action, pipe-length replacement, auger anode protection, pit clamping, structural liner, and nonstructural liner;
wherein, prior to allowing the user to define at least one repair scenario, the user is assisted in selecting repair options by providing the user with a set of suggested repair options based on a predefined selection logic; and
wherein the wall dimensional data includes an estimated average wall thickness and the predefined selection logic includes comparing the estimated average wall thickness with a threshold average wall thickness amount to identify one or more repair options appropriate for the overall condition of the pipe-length.

31. The method according to claim 30, wherein the wall dimensional data includes extent data and the predefined selection logic includes comparing the extent data to a threshold extent amount to determine the circumferential amount of pitting corrosion.

32. A method of modeling pipe-length wall thickness comprising:
(a) representing the wall thickness of the pipe-length as the thickness of the elements of a grid covering the surface of the pipe-length; and
(b) assigning a probabilistic variable thickness distribution to each element in the grid;
wherein the thickness distribution includes a standard deviation calculated as a function of the probability of the wall being less than or equal to a minimum wall thickness.

33. The method according to claim 32, wherein the probabilistic wall thickness distribution is characterized by an average wall thickness and a minimum wall thickness.

34. The method according to claim 33, wherein the average wall thickness and minimum wall thickness are determined from actual measurements taken of the pipe length using an inspection device.

35. The method according to claim 34, wherein the probabilistic wall thickness distribution includes consideration of an inspection device measurement error.

36. The method according to claim 35, wherein determination of an error parameter is accomplished by inspecting a pipe in situ using an inspection device, physically measuring the pipe, and comparing the in situ measurements with the physical measurements.

37. A method of modeling pipe-length wall thickness comprising:
 (a) representing the wall thickness of the pipe-length as the thickness of the elements of a grid covering the surface of the pipe-length; and
 (b) assigning a probabilistic variable thickness distribution to each element in the grid;
  wherein the probabilistic wall thickness distribution is characterized by an average wall thickness and a minimum wall thickness;
  wherein the average wall thickness and minimum wall thickness are determined from actual measurements taken of the pipe length using an inspection device;
  wherein the probabilistic wall thickness distribution includes consideration of an inspection device measurement error; and
  wherein the consideration of an inspection device measurement error includes calculation of at least one of an average wall thickness measurement error parameter $C_\mu$, a minimum wall thickness measurement error parameter $C_{min}$, and a circumferential extent measurement error parameter $C_\theta$.

* * * * *